United States Patent
Pereira

(10) Patent No.: US 10,532,438 B2
(45) Date of Patent: Jan. 14, 2020

(54) DRILLING DEVICE AND METHOD FOR ADJUSTING CUTTING OPERATIONAL PARAMETERS DURING DRILLING OF A MULTILAYER ELEMENT

(71) Applicant: SETI-TEC, Collegien (FR)

(72) Inventor: Sebastien Pereira, Charneca da Caparica (PT)

(73) Assignee: SETI-TEC, Collegien (FR)

( * ) Notice: Subject to any disclaimer, the term of this patent is extended or adjusted under 35 U.S.C. 154(b) by 0 days.

(21) Appl. No.: 15/804,499

(22) Filed: Nov. 6, 2017

(65) Prior Publication Data
US 2018/0126509 A1    May 10, 2018

(30) Foreign Application Priority Data

Nov. 4, 2016    (FR) ...................................... 16 60715

(51) Int. Cl.
*B23Q 17/09*    (2006.01)
*B23Q 15/12*    (2006.01)
(Continued)

(52) U.S. Cl.
CPC .......... *B23Q 17/0966* (2013.01); *B23B 35/00* (2013.01); *B23Q 5/32* (2013.01);
(Continued)

(58) Field of Classification Search
CPC .... B23Q 17/0966; B23Q 17/099; B23Q 5/32; B23Q 15/12; B23B 35/00; B23B 49/00;
(Continued)

(56) References Cited

U.S. PATENT DOCUMENTS

| 4,451,187 | A | * | 5/1984 | Ishikawa | ................ | B23Q 11/04 |
| | | | | | | 408/11 |
| 4,854,786 | A | * | 8/1989 | Alexander | ......... | G05B 19/4163 |
| | | | | | | 408/1 R |

(Continued)

FOREIGN PATENT DOCUMENTS

| EP | 1618978 A1 | 1/2006 |
| EP | 1982783 A1 | 10/2008 |
| FR | 3000693 A1 | 7/2014 |

OTHER PUBLICATIONS

French Search Report dated Jun. 21, 2017 for corresponding French Application No. 1660715, filed Nov. 4, 2016.

(Continued)

*Primary Examiner* — Harshad R Patel
*Assistant Examiner* — Nigel H Plumb
(74) *Attorney, Agent, or Firm* — David D. Brush; Westman, Champlin & Koehler, P.A.

(57) ABSTRACT

A method for drilling an element to be drilled by a drilling device and a cutting tool including drill margins and cutting edges. The method includes determining at least one load value representing overall drag due to internal friction of the drilling device and to friction of drill margins in the element to be drilled. Determining includes: stopping a drilling operation in progress; partial retraction of the cutting tool on a predetermined distance, the predetermined distance being chosen such that the cutting edges are no longer in contact with the element to be drilled; driving the cutting tool with predetermined cutting parameters; measuring at least one load value during the driving of the cutting tool with the cutting parameters before its cutting edges again come into contact with the element to be drilled and after stabilization of the load values, the measured load value representing the overall drag.

20 Claims, 9 Drawing Sheets

(51) Int. Cl.
*B23B 35/00* (2006.01)
*B23Q 5/32* (2006.01)
*G05B 19/416* (2006.01)
*B23B 49/00* (2006.01)

(52) U.S. Cl.
CPC ........... *B23Q 15/12* (2013.01); *B23Q 17/099* (2013.01); *G05B 19/4163* (2013.01); *B23B 49/00* (2013.01); *B23B 2228/36* (2013.01); *B23B 2270/32* (2013.01); *B23B 2270/48* (2013.01); *B23B 2270/483* (2013.01); *G05B 2219/37373* (2013.01); *G05B 2219/45129* (2013.01)

(58) Field of Classification Search
CPC ............ B23B 2228/36; B23B 2270/32; B23B 2270/48; B23B 2270/483; B23B 39/10; B23B 47/24; G05B 19/4163; G05B 2219/37373; G05B 2219/45129
See application file for complete search history.

(56) References Cited

U.S. PATENT DOCUMENTS

| | | | |
|---|---|---|---|
| 7,806,637 B2 | 10/2010 | Dehninger et al. | |
| 8,388,276 B2* | 3/2013 | Jaillon | B23B 35/005 408/1 R |
| 9,387,541 B2* | 7/2016 | Pereira | B23B 39/10 |
| 2006/0018724 A1* | 1/2006 | Oehninger | B23B 35/00 408/124 |

OTHER PUBLICATIONS

English translation of the Written Opinion dated Jun. 21, 2017 for corresponding French Application No. 1660715, filed Nov. 4, 2016.

* cited by examiner

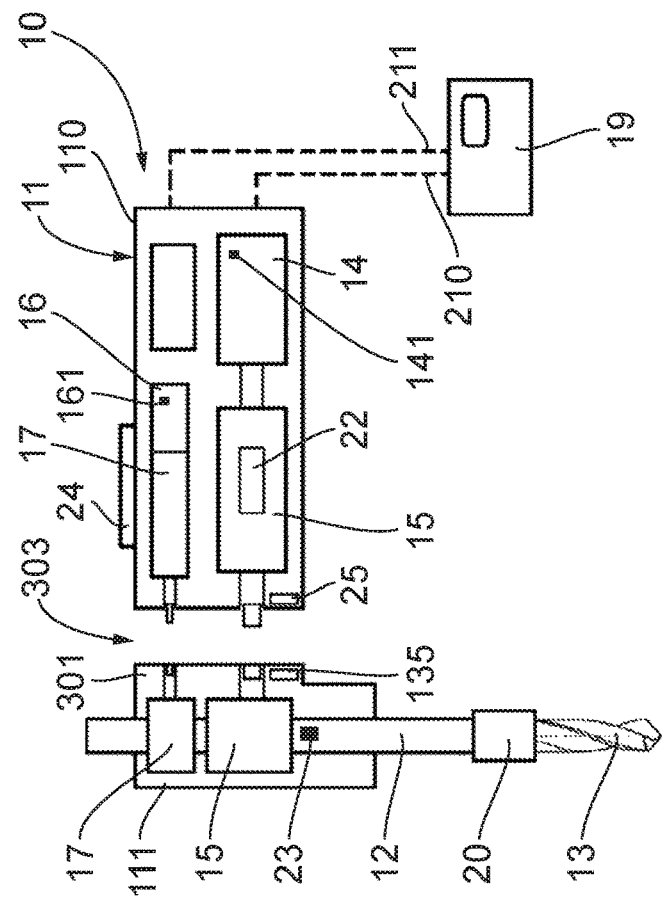
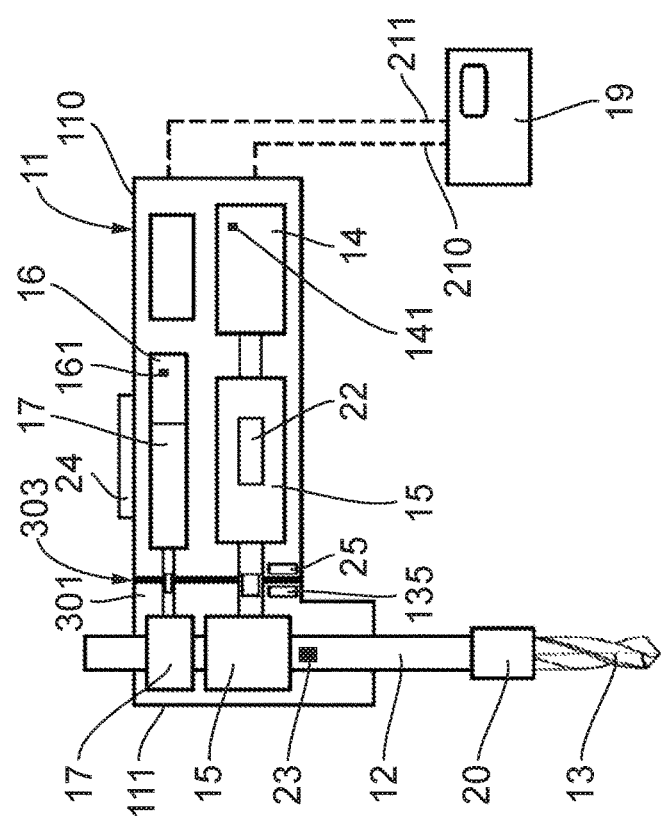

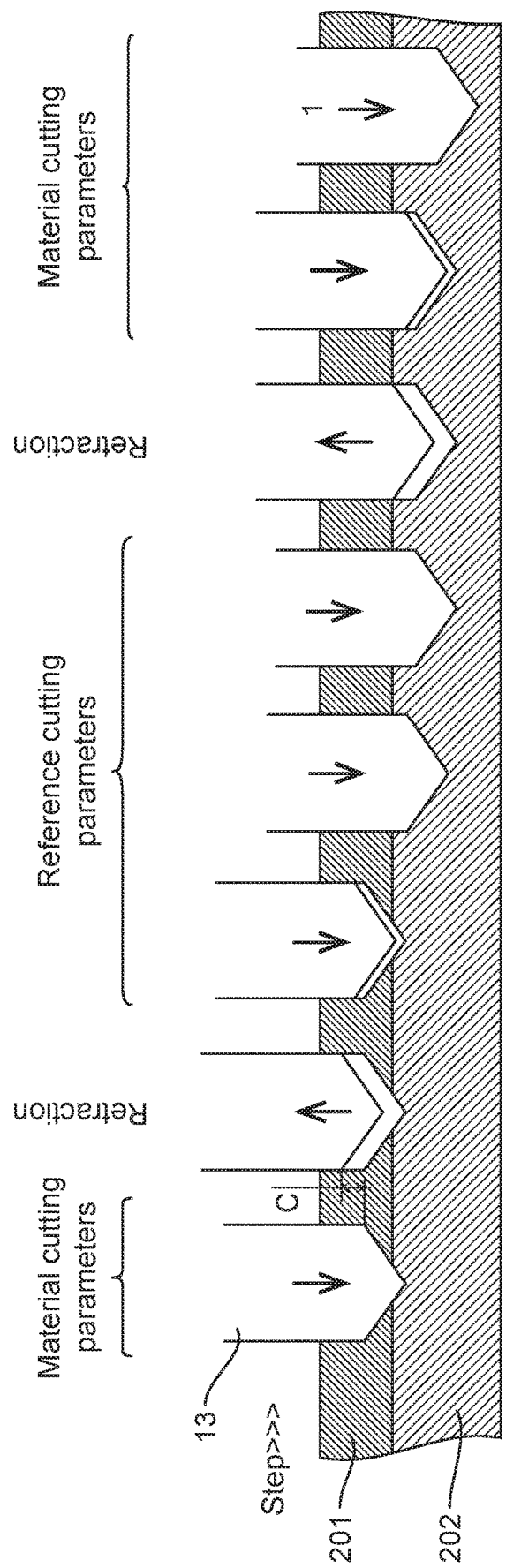

DRILLING DEVICE AND METHOD FOR ADJUSTING CUTTING OPERATIONAL PARAMETERS DURING DRILLING OF A MULTILAYER ELEMENT

1. CROSS-REFERENCE TO RELATED APPLICATIONS

This Application priority to and the benefit of French Application No. 1660715 filed Nov. 4, 2016, the content of which is incorporated herein by reference in its entirety.

2. FIELD OF THE INVENTION

The field of the invention is that of drilling techniques, especially for the drilling of multilayer elements, i.e. elements comprising a stack of several layers of different materials.

The invention especially relates to methods of drilling as well as devices implemented for this purpose.

3. PRIOR ART

Multilayered materials are increasingly coming into common use, especially in aeronautics for the manufacture of aircraft.

These multilayer materials are composed of a plurality of successive stacked layers made out of different materials.

The materials that come into the composition of these multilayer materials include especially aluminum alloys, titanium alloys, stratified carbon fiber, GLARE (Glass Laminate Aluminum Reinforced Epoxy), stainless steel, Iconel.

In the field of aeronautics, these multilayer materials are often drilled by means of:
  hand-held drills, during the use of which the thrust on the drill bit is generated manually;
  drills, during the use of which the forward feed of the drill is motor driven, the body being fixed to a support during drilling and being moved manually by an operator from one drilling point to another; these drills include:
    automatic feed drills for which the feed rate and the rotation frequency of the drill bit are dependent, and
    drills with controlled cutting parameters for which the feed rate and the rotation frequency of the drill bit can vary independently of each another;
  drilling robots which can be likened to machine tools, during the use of which the rotation frequency and the feed rate of the drill bit can be controlled independently of each other as in the case of drills with controlled cutting parameters.

The present invention is more particularly intended for implementation in the context of drills with controlled cutting parameters and drilling robots. Such drilling devices, also called drilling devices with controlled cutting parameters, are connected to a control box containing especially the drilling program, i.e. all the information used for the automatic execution of a drilling strategy.

Such drilling devices classically comprise a casing that houses a feed motor and a rotation motor, at the end of which there extends a spindle intended to drive a cutting tool such as a drill bit, the motors being linked to the spindle through a transmission.

These drilling devices carry out the drilling of an element to be drilled during a drilling operation that conventionally comprises a phase in which the drill bit is made to approach the element to be drilled, a phase for centering the drill bit, a drilling phase proper with cutting parameters adapted to the materials encountered, a phase for the exit of the drill bit from the part to be drilled and then a phase of withdrawal.

Referring to FIG. 3, the tip of a drill bit 13 classically comprises a central edge 130 laterally extended by main edges 131 which end in cutting lips 132. The cutting lips 132 are extended by drill margins 133 that extend helically and define the diameter of the drill bit. The surface that extends between the central edge 130 and the cutting lips 132 include the end tip 134 of the drill bit, defining the cone of the drill which has a height H.

The function of the drill bit is to cut the material along a path defined by the cutting parameters (especially rotation speed, feed per turn with, if necessary an alternative component).

The materials have different drilling difficulties given their differences of resilience, adherence and abrasiveness. This dictates the use of cutting parameters proper to each material in order to obtain:
  controlled quality;
  optimum productivity;
  acceptable wear and tear for the drill bit.

The measurement and monitoring of the load on the drill bit (the torque or thrust force along the drilling axis) during a drilling operation can help) in controlling drilling quality and management of wear and tear on the drill bit.

Indeed, for given cutting parameters, the load on the drill bit increases with the wear and tear on the drill bit. Monitoring it then makes it possible to replace the drill bit when the load becomes excessive and causes the drill bit to get worn out.

Besides, during a drilling operation, it is possible to detect a change of material, identify the material newly encountered by the drill bit and adapt the cutting parameters accordingly, in doing so through the monitoring of the load on the drill bit.

When the drill bit pierces a given material with given cutting parameters proper to this material (these parameters are called "material-cutting parameters"), such a technique relies on a comparison of the load values to which the drill is subjected with predetermined intervals or ranges of load values proper to this material, drilled by a given type of drill bit and its cutting parameters.

When said load values are outside the predetermined range for the material assumed to be in the course of being drilled, then a new material has been encountered by the drill bit.

It is then possible to identify the new material being drilled by applying identical cutting parameters for each of the materials of the group of materials forming the part to be drilled with a given drill bit, these cutting parameters being called "reference cutting parameters", and by comparing the values of loads on the drill bit with the predetermined reference ranges. These reference ranges are predetermined in the laboratory for each material drilled with the reference cutting parameters and a drill bit similar to the one used.

The new material identified is the one for which the range of load values contains the load value measured during the drilling with the reference parameters.

The reference cutting parameters are, for a given group of materials, the restrictive or binding cutting parameters based on the cutting speed and feed rate values for the material or materials of the group dictating minimum or maximum boundary values, below or above which a major drawback appears such as premature wear and tear of the cutting edges of the drill bit.

A load value on the drill bit can be:
- the measurement by a torque sensor placed on the transmission unit between the rotation motor of the drill bit, and the drill bit expressing the torque applied to the drill bit;
- the measurement by a force sensor placed on the spindle expressing the axial thrust on the drill bit;
- the measurement of the power or intensity consumed by the rotation motor of the drill bit, expressing the torque applied to the drill bit (in taking account of the transmission ratio in the case of a two-speed drill);
- the measurement of the power or intensity consumed by the feed motor of the drill bit, expressing the thrust applied to the drill bit.

This method therefore makes use of the fact that each type of material will give rise to different forces between the different types of materials in the edges of the drill bit, subjected to given reference cutting parameters.

For this method to be efficient, the load values obtained during the application of the reference cutting parameters should be:
- repeatable with load dispersion for one and the same material and one and the same drill bit; in other words the ranges of predetermined load values are narrow;
- distinct between different types of material.

The greater the extent to which these ranges are distinct and repeatable, the lower is the risk of mistaking two different materials for each other in the method of determining the material encountered by a drill bit and, therefore, the greater the reliability of the method.

One way to distinctly separate these load values of the different materials is to choose reference parameters (cutting feed or cutting speed) that are the highest within the permitted boundary of the binding parameters. The higher the reference parameters, the greater will be the forces on the drill bit and the greater will be the divergence between the load values of the different materials.

However, the monitoring of the load on the drill bit, both from the viewpoint of assessing wear and tear on the drill bit and from the viewpoint of identifying the material being drilled, can be made difficult by the existence of parasitic phenomena affecting the load of the drill bit.

During the drilling of a hole, certain phenomena can accentuate the friction of the drill margins on the walls of the hole in being drilled, among others:
- certain materials can, during drilling, get slightly deformed within their elastic limit under the cutting forces of the drill bit and after drilling get smaller in diameter on the drill bit: this phenomenon is sometimes encountered in titanium alloys and carbon fiber.
- sometimes, the tip of the drill bit can exert a slight push, when being centered, on the entry face of the drilling operation: this causes a misalignment of the drill bit relative to the axis of the drill spindle and therefore friction of the drill margins on the walls of the hole.

To avoid this friction, a back taper is generally provided on the drill margins, such that the tail diameter of the drill bit is smaller than the diameter of the lip by 10 µm for the diameter and by 10 millimeters for the length of the drill bit.

The taper is aimed at creating a clearance between the drill margins and the walls of the drilled hole and therefore at thus preventing:
- the torque value from increasing excessively with the depth drilled,
- the wall of the hole from deteriorating by friction,
- the heating of the drilling from becoming too great.

However, this back taper should not be too great so as not to degrade the centering of the drill bit in the hole and thus create the risk of the drilling being off-centered relative to the desired path.

Certain materials are adhesive. This results, during a drilling operation, in a phenomenon of adhesion of the cut material to the cutting face of the drill or to the drill margins when the cutting conditions, for example the lubrication, are not adequate (there is a typical adhesion of titanium when the speed is excessive because of heating, even if the lubrication is appropriate). This occurs with certain titanium or aluminum alloys.

This phenomenon of adhesion leads to:
- premature wear and tear of the drill bit, with a risk of breakage, and heating;
- a deteriorated geometry and surface condition of the hole;
- above-normal cutting forces.

Another parasitic phenomenon is related to the removal of chips during a drilling operation.

In helical drill bits, the chips rise up in part naturally by friction of the chips against the wall of the drilled hole, tending to make them follow the helical flute until the extraction of the drill.

The removal is also obtained by injection of lubricated air into two channels present in the body of the drill bit. The compressed air exits from the channels at the extremity of the drill bit on the clearance faces of the drill bit. It comes out of the hole during the drilling operation in rising by the two flutes in the case of helical or symmetrical drill bits or by the flute in the case of ¾ drill bits.

When the blowing of compressed air or the size of the chips are not satisfactory, the chips can "jam" or "clog up" i.e. accumulate excessively in the hole during drilling and give rise to:
- a risk of breakage, heating;
- a highly deteriorated surface condition of the hole;
- above-normal cutting force.

Such parasitic phenomena disturb the measurement of the load on the drill bit during drilling and thus adversely affect:
- the evaluation of the wear and tear on the drill bit,
- the identifying of the material during drilling, and therefore the quality of a drilling operation.

4. SUMMARY

To this end, an exemplary embodiment of the invention proposes a method for drilling an element to be drilled by means of a drilling device and a cutting tool comprising drill margins and cutting edges, said method comprising a step for determining at least one load value representing the overall drag due to internal friction of said drilling device and to the friction of said drill margins in the said element to be drilled, said step comprising the following sub-steps:
- stopping the drilling operation in progress;
- partial retraction of said cutting tool over a predetermined distance, said predetermined distance being chosen in such a way that said cutting edges are no longer in contact with said element to be drilled;
- driving of said cutting tool with predetermined cutting parameters;
- measurement of at least one load value during the driving of said cutting tool with said cutting parameters before its cutting edges again come into contact with said element to be drilled and after the stabilization of said load values, said at least one measured load value representing said overall drag.

Thus, the invention relies on an original approach that consists of the determining, during a drilling operation, of the overall drag due to the internal friction of a drilling device and the frictions of the drill margin against the walls of the drilled element.

As understood in the invention, the stoppage of the drilling operation in progress, also called drilling in progress or drilling operation, means that the forward feed of the drill bit in the direction of drilling of the element to be drilled is stopped, it being possible for the shifting in rotation of the drill bit to be maintained or not maintained at this stage.

Inasmuch as it is sought to determine a piece of information representing the overall drag due equally to friction internal to the drilling device as to the friction of the drill margins against the internal wall of the hole being drilled in the element to be drilled, the retraction of the drill bit on a predetermined distance is necessarily a partial retraction of the drill bit so that its cutting edges are no longer engaged with the element to be drilled (at this stage, no longer any material is being removed) whereas its drill margins are always inside the hole being drilled and thus undergo friction, as the case may be, against the internal wall of the drilled hole. Naturally, the portions of drill margins situated inside the hole being drilled will vary according to the depth of the drilling in progress. The retraction therefore does not lead to any total extraction of the cutting tool outside the hole being drilled.

The predetermined distance of retraction is chosen so as to be:

small enough for the overall drag measured to be the closest to the one undergone by the cutting tool when it was in the action of cutting at the instant preceding the retraction, and great enough to enable the measurement of the overall drag, namely a distance of retraction of the order of 1 millimeter.

Such a parameter can be used during a drilling operation to detect the occurrence of an event which, when taken into consideration, can optimize the drilling.

For example, during a given drilling operation, the reaching by the total drag of a predetermined upper threshold could mean that the drill bit and/or the drilling device is worn out or more generally it can signify an anomaly. The drilling operation can then stopped and/or warning message sent so that steps are taken to correct the problem or problems that have occurred in order to improve the drilling quality.

According to one possible variant, a method according to the invention comprises a step for determining at least one load value representing the drag of the drill margins due to friction of said drill margins with said element to be drilled, said step comprising the following sub-steps:

determining at least one load value representing the drag of said drilling device due to the internal friction of said drilling device working with said predetermined cutting parameters;

subtracting, from said at least one load value representing the overall drag, of said at least one load value representing the drag of said drilling device, the result of said subtraction being equal to said at least one load value representing the drag of the drill margins.

Such a parameter can be used, during a drilling operation, to detect the occurrence of an event, the taking into consideration of which can optimize the drilling, especially when the event is a faulty removal of the chips (jamming) or the gripping of the material on the drill bit.

According to one possible variant, a method according to the invention comprises a step for determining at least one load value representing cutting forces generated by the removal of material from said element to be drilled during a drilling operation, comprising the following sub-steps:

the measurement of at least one load value during the drilling of said element to be drilled with said predetermined cutting parameters;

the subtraction, from said at least one load value measured during the drilling of said element to be drilled, of said at least one load value representing said overall drag, the result of said subtraction being equal to said at least one load value representing cutting forces.

Such a parameter can be used, during a drilling operation, to detect the occurrence of an event, such as wear and tear of the cutting edges or an adhesive material, the taking into consideration of which can enable the drilling to be optimized.

In this case, and according to one possible variant in which said predetermined cutting parameters are reference cutting parameters specific to the group of materials to which the material being drilled belongs and to the type of drill implemented to carry out the drilling operation in progress, said method comprises a step for comparing said at least one load value representing cutting forces with predetermined ranges of reference load values representing cutting forces, each of said ranges being specific to one of the materials of said group.

In this case, a method according to the invention can furthermore comprise a step for stopping the drilling operation in progress and/or sending out a warning signal when said at least one load value representing cutting forces belongs to none of said ranges of reference load values representing cutting forces.

According to one possible variant, a method according to the invention comprises a step for verifying the friction of said drill margins comprising:

the comparison of said at least one load value representing the drag of the drill margins with a predetermined threshold value;

the detection of abnormal friction of said drill margins when said at least one load value representing the drag of the drill margins becomes greater than said predetermined threshold value.

In this case, a method according to the invention preferably comprises a step of unjamming when it is detected that the friction of the drill margins is abnormal.

According to one possible variant in which said predetermined cutting parameters are predetermined material-cutting parameters specific to the material being drilled and to the type of drill bit implemented to carry out the drilling operation in progress, a method according to the invention comprises a step for verifying cutting forces comprising the comparison of said at least one load value representing cutting forces with a predetermined standard range of material-cutting load values specific to the material being drilled for a drill bit, the cutting edges of which have a minimum quality required for accurate drilling and for said predetermined material-cutting parameters.

Said step for verifying the cutting forces comprises preferably the detection of abnormal cutting forces when said at least one load value representing cutting forces is not within said standard range of material-cutting load values.

According to one possible variant, a method according to the invention comprises a step for identifying the material being drilled, said step of identification comprising;

a step for activating or maintaining specific reference cutting parameters specific to the group of materials to which the material being drilled belongs and to the type of drill bit implemented to carry out the drilling operation in progress;

a step for determining the material being drilled, said material being drilled being the one for which the range of reference load values representing cutting forces contain said at least one load value representing the cutting forces;

a step for activating predetermined material-cutting parameters specific to the material identified at said step for determining and to the type of drill bit implemented;

a step for determining at least one load value representing cutting forces with said material-cutting parameters;

a step for validating the material identified during said step for determining, said determining of the material being validated when the at least one load value representing cutting forces, determined in implementing said material-cutting parameters, belongs to an range of load values representing cutting forces predetermined with said material-cutting parameters for the material identified.

The implementing of such a step enables the material being drilled to be identified reliably.

According to one possible variant, a method according to the invention comprises a step for stopping said drilling when it is detected that the cutting forces are abnormal or that no material is identified.

According to one possible variant, a method according to the invention comprises a step for sending out a warning signal when it is detected that the friction of the drill margins is abnormal and/or when it is detected that the cutting forces are abnormal and/or that no material is identified.

The present invention also relates to a drilling device that is to be implemented to carry out at least one operation for drilling an element to be drilled by means of a cutting tool comprising drill margins and cutting edges, said device comprising means for determining at least one load value representing the overall drag due to the internal friction of said drilling device and to the friction of said drill margins in said element to be drilled, these means for determining comprising:

means for stopping the drilling operation in progress;

means of partial retraction of said cutting tool on a predetermined distance, said predetermined distance being chosen in such a way that said cutting edges are no longer in contact with said element to be drilled;

means for driving said cutting tool with predetermined cutting parameters;

means for measuring at least one load value during the driving of said cutting tool with said cutting parameters before its cutting edges again come into contact with said element to be drilled and after stabilization of said load values, said at least one measured load value representing the overall drag.

According to one possible variant, a device according to the invention comprises means for determining at least one load value representing the drag of the drill margins due to the friction of said drill margins in said element to be drilled, these means comprising:

means for determining at least one load value representing the drag of said drilling device due to the internal friction of said drilling device working with said predetermined cutting parameters;

means of subtraction, from said at least one load value representing the overall drag, of said at least one load value representing the drag of said drilling device, the result of said subtraction being equal to said at least one load value representing the drag of the drill margins.

According to one possible variant, a device according to the invention comprises means for determining at least one load value representing cutting forces generated by the removal of material from said element to be drilled during a drilling operation, these means comprising:

means for measuring at least one load value during the drilling of said element to be drilled with said predetermined cutting parameters;

means of subtraction, from said at least one load value measured during the drilling of said element to be drilled, of said at least one load value representing said overall drag, the result of said subtraction being equal to said at least one load value representing cutting forces.

According to one possible variant, said predetermined cutting parameters are reference cutting parameters specific to the group of materials to which the material being drilled belongs and to the type of drill bit implemented to carry out the drilling operation in progress, a device according to the invention comprising means of comparison of said at least one load value representing cutting forces with predetermined ranges of reference load values representing cutting forces, each of said ranges being specific to one of the materials of said group.

According to one possible variant, a device according to the invention comprises means for stopping the drilling operation in progress and/or for sending a warning signal when said at least one load value representing cutting forces belongs to none of said ranges of reference load values representing cutting forces.

According to one possible variant, a device according to the invention comprises means for verifying the friction of said drill margins comprising:

means for comparing said at least one load value representing the drag of the drill margins with a predetermined threshold value;

means for detecting an abnormal friction of said drill margins when said at least one load value representing the drag of the drill margins becomes greater than said predetermined threshold value.

According to one possible variant, a device according to the invention comprises means to control an unjamming when it is detected that the friction of the drill margins is abnormal.

According to one possible variant in which said predetermined cutting parameters are predetermined material-cutting parameters specific to the material being drilled and to the type of drill bit implemented to carry out the drilling operation in progress, a device according to the invention comprises means of verification of the cutting forces comprising means for comparing said at least one load value representing cutting forces with a predetermined standard range of material-cutting load values specific to the material being drilled for a drill bit, the cutting edges of which have the minimum quality required for accurate drilling and for said predetermined material-cutting parameters.

According to one possible variant, a device according to the invention comprises means for detecting abnormal cutting forces when said at least one load value representing cutting forces is not included in said standard range of material-cutting load values.

According to one possible variant, a device according to the invention comprises means for identifying the material being drilled, said identification means comprising:
- means for activating or maintaining reference cutting parameters specific to the group of materials to which the material being drilled belongs and to the type of drill bit implemented to carry out the drilling operation in progress;
- means for determining the material being drilled, said material being drilled being the one for which the range of reference load values representing the cutting forces contains said at least one load value representing the cutting forces;
- means for activating predetermined material-cutting parameters specific to the material identified at said step for determining and to the type of drill bit implemented;
- means for determining at least one load value representing cutting forces with said material-cutting parameters;
- means for validating the material identified during said step for determining, said determining of the material being validated when the at least one load value representing cutting forces, determined in implementing said material-cutting parameters, belongs to a range of load values representing cutting forces predetermined with said material-cutting parameters for the material identified.

According to one possible variant, a device according to the invention comprises means for stopping said drilling operation when it is detected that the cutting forces are abnormal or that no material is identified.

According to one possible variant, a device according to the invention comprises means for sending out a warning signal when it is detected that the friction of the drill margins is abnormal and/or when it is detected that the cutting forces are abnormal and/or that no material is identified.

The present invention also relates to a computer program comprising program code instructions for executing the steps of the drilling method according to any one of the variants explained here above, when said program is executed by a processor.

The present invention also relates to a computer-readable recording medium on which there is recorded a computer program comprising program code instructions for executing the steps of the drilling method according to any one of the variants explained here above, when said program is executed by a processor.

5. LIST OF FIGURES AND TABLES

Other features and advantages of the invention shall appear more clearly from the following description of particular embodiments given by way of simple illustrative and non-exhaustive examples and from the appended drawings, of which:

FIGS. 1a and 1b illustrate a drilling device according to the invention with detachable head;

FIG. 10 illustrates the shifting of a drill in a part to be drilled comprising two layers of materials 201, 202 during a method according to the invention.

Figure 2:
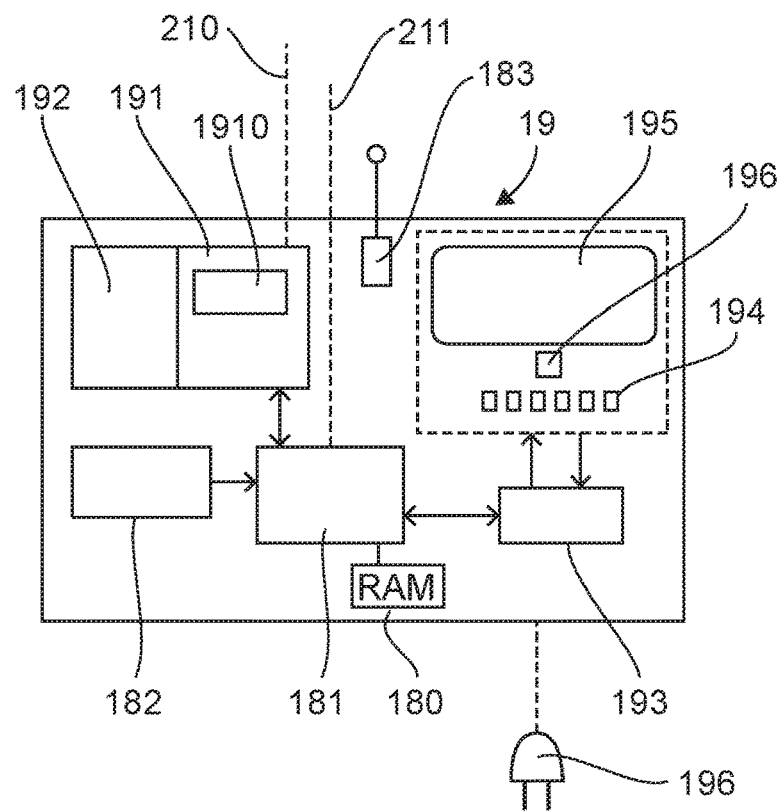
FIG. 2 illustrates a controller of a drilling device according to the invention.
Figure 3:
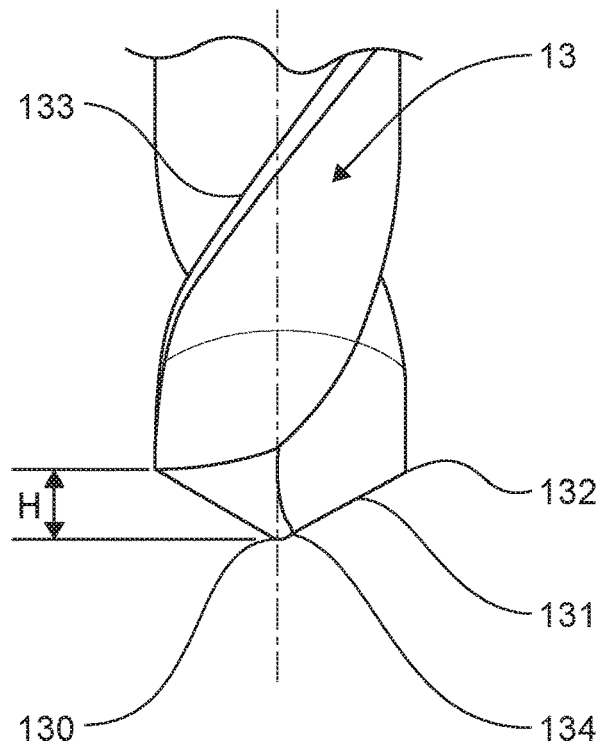
FIG. 3 illustrates the extremity of a drill bit.
Figure 4:
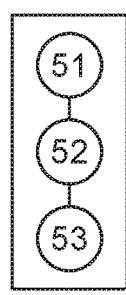
FIGS. 4 to 9 are flowcharts of the laboratory evaluation of a drilling head.
Figure 5:
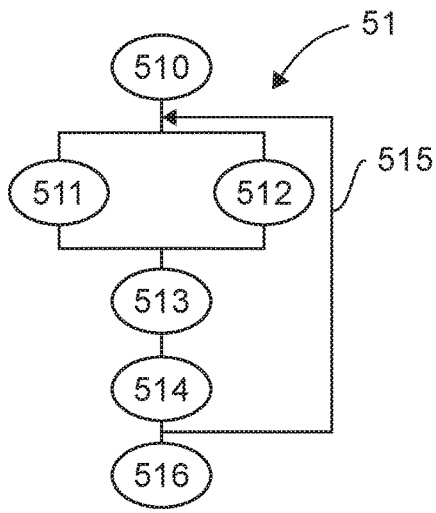
Figure 6:
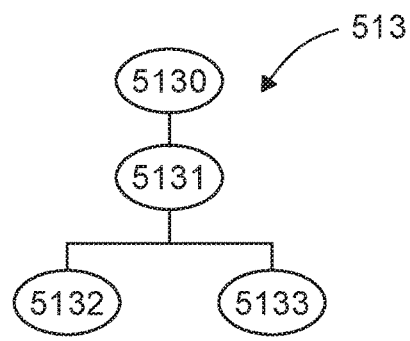
Figure 7:
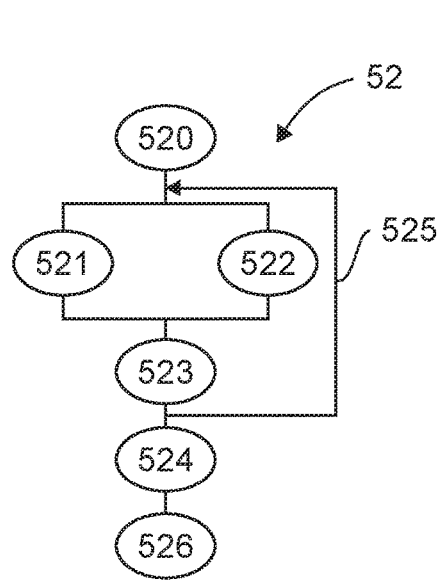
Figure 8:
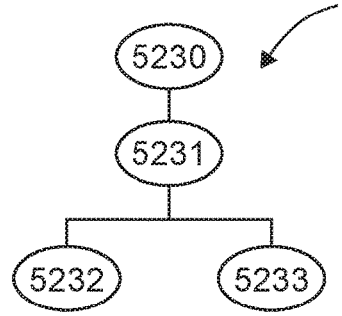
Figure 9:
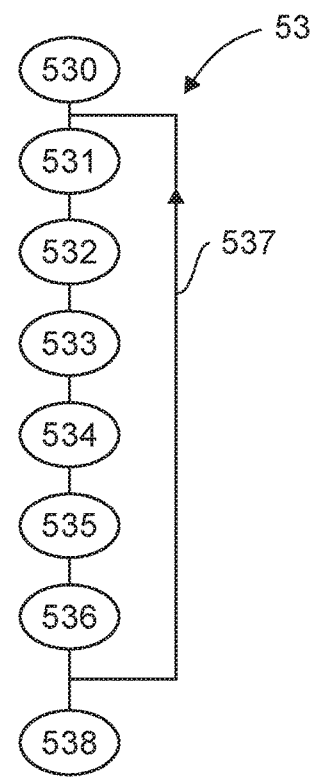
Figure 11A:
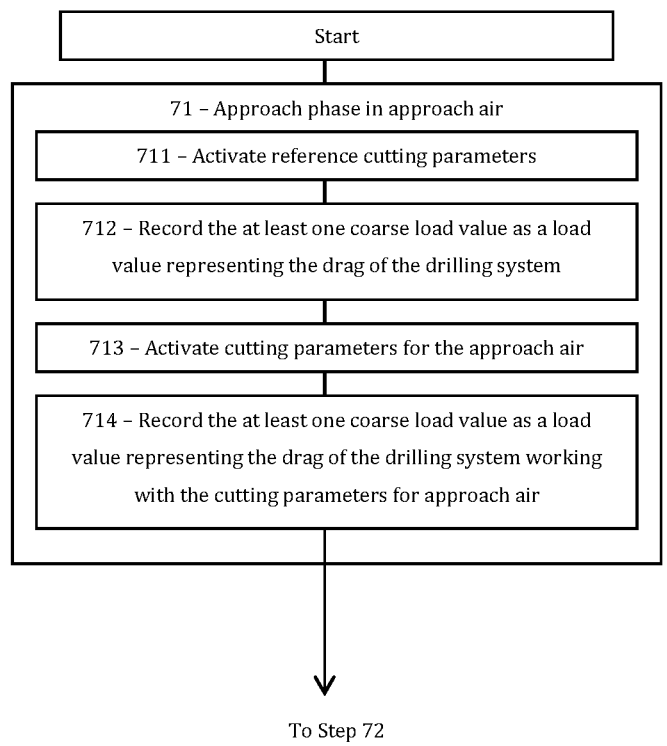
FIGS. 11A-11E illustrate a flow chart of an example of a drilling method according to the invention.
Figure 11B:
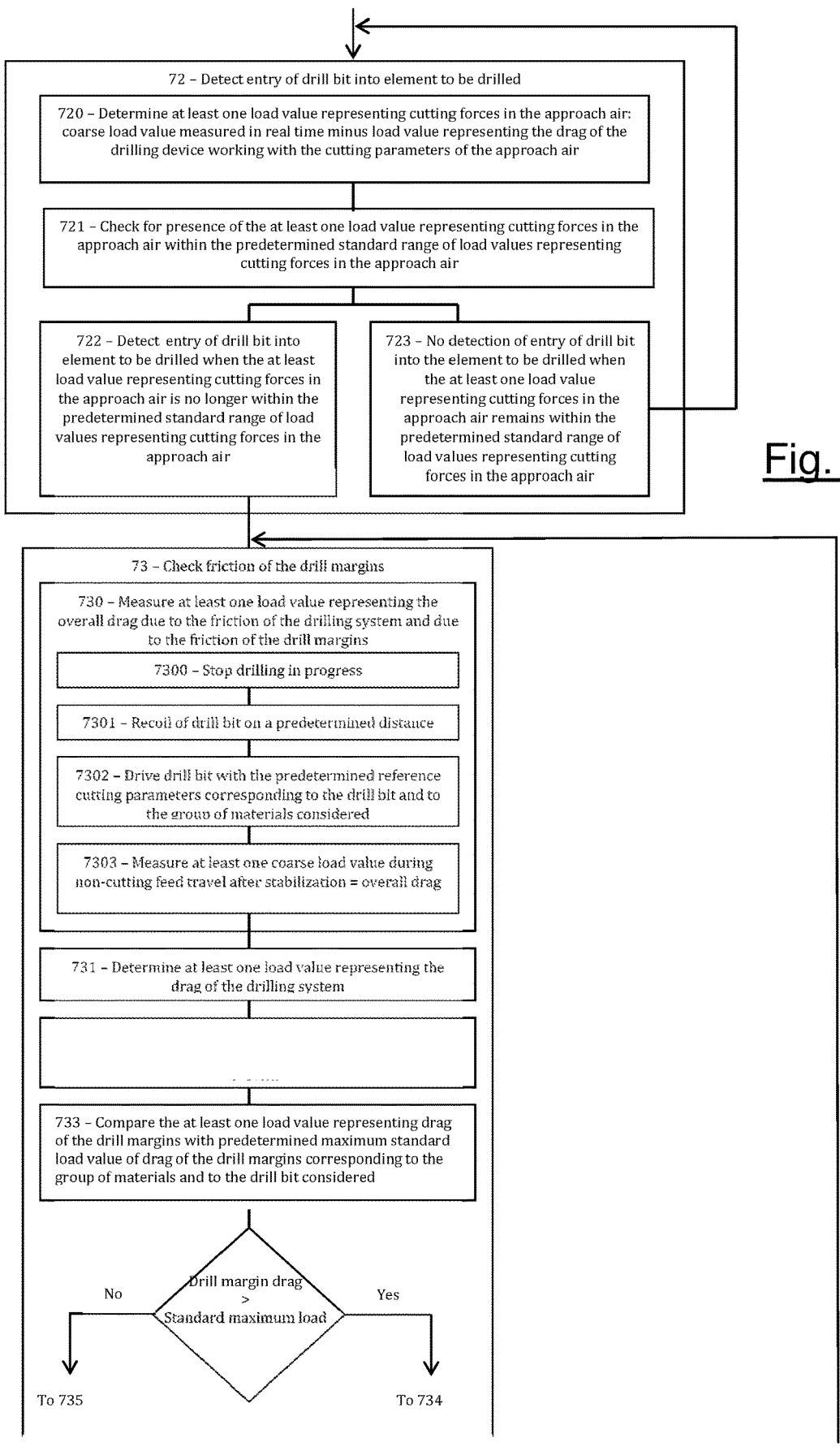
Figure 11C:
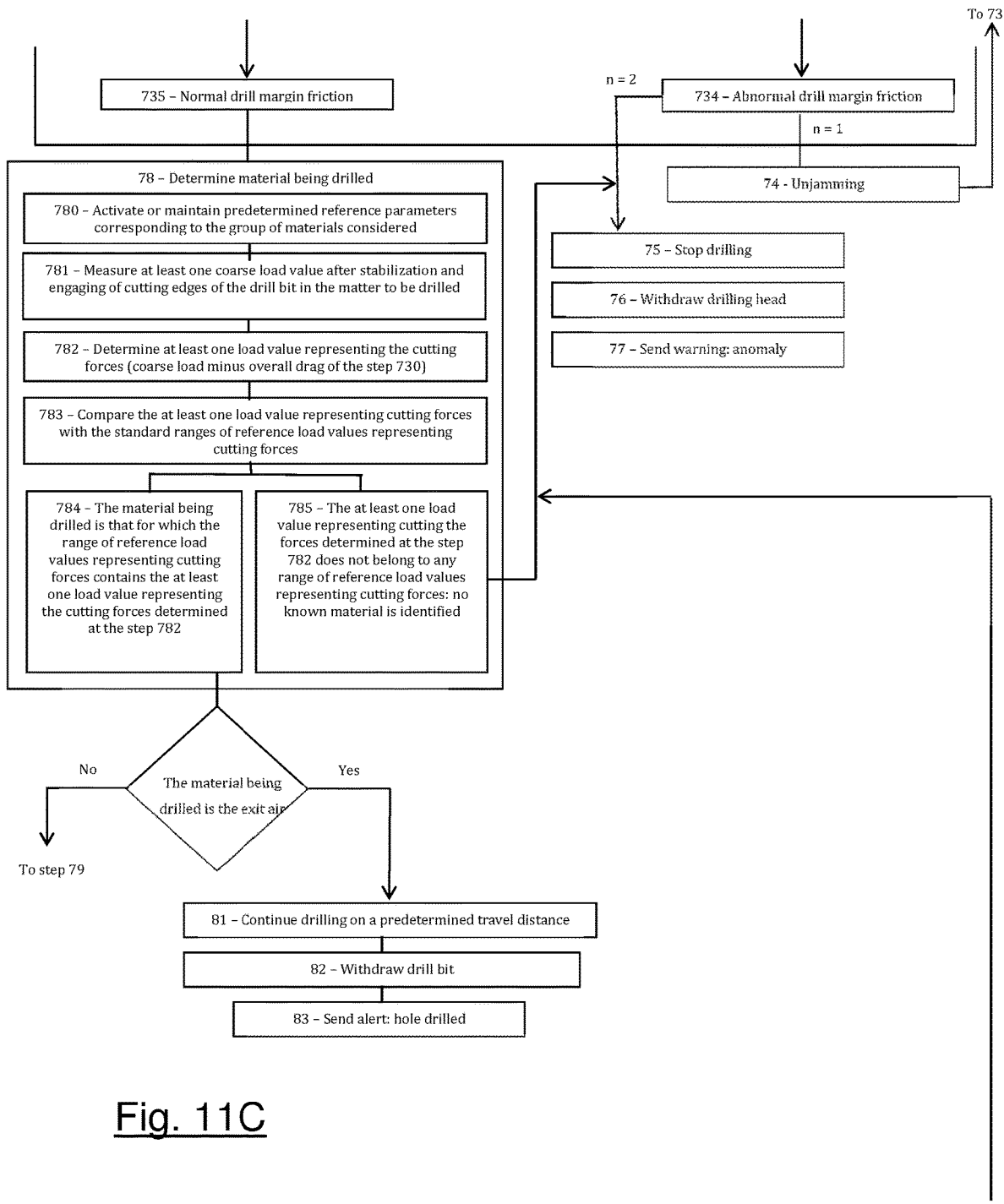
Figure 11D:
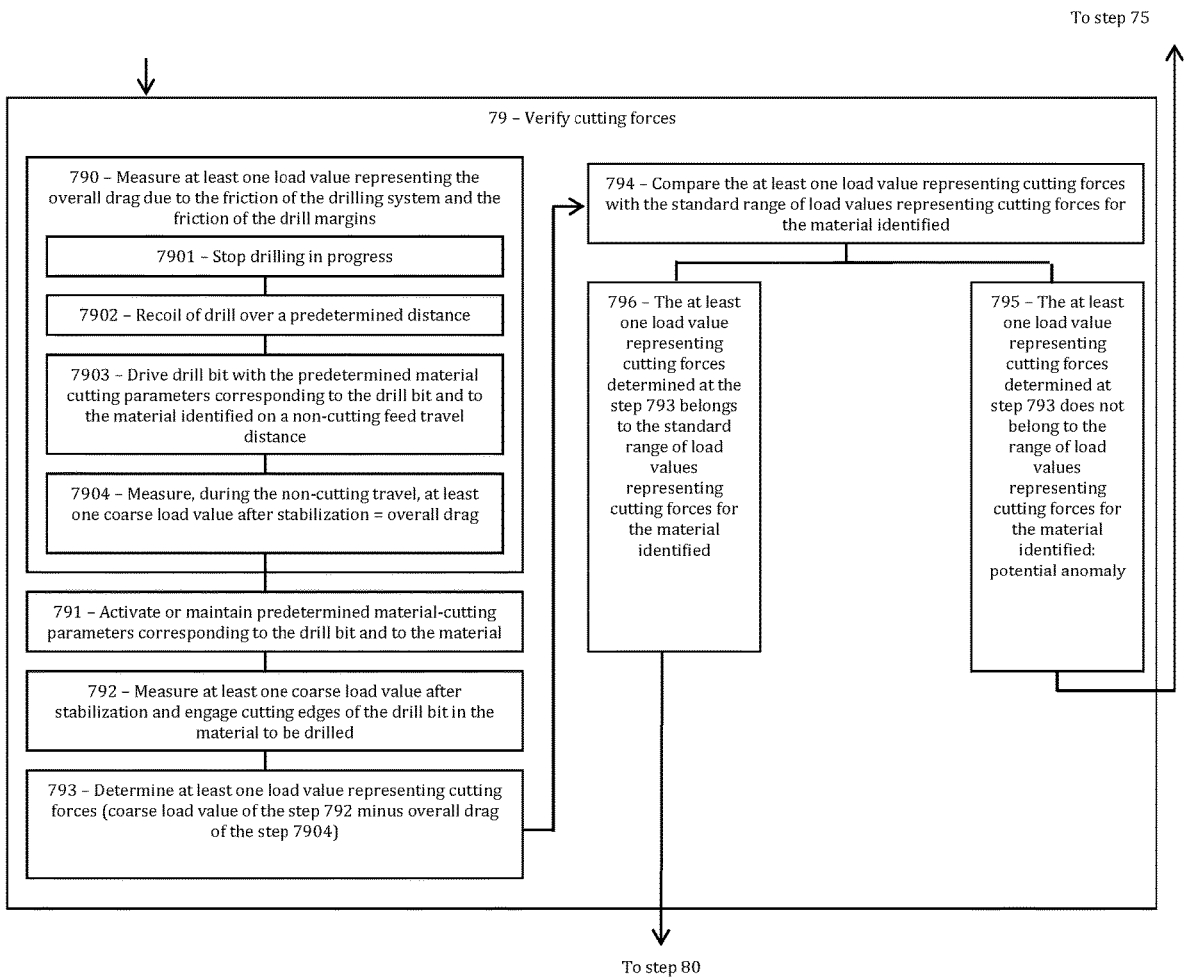
Figure 11E:
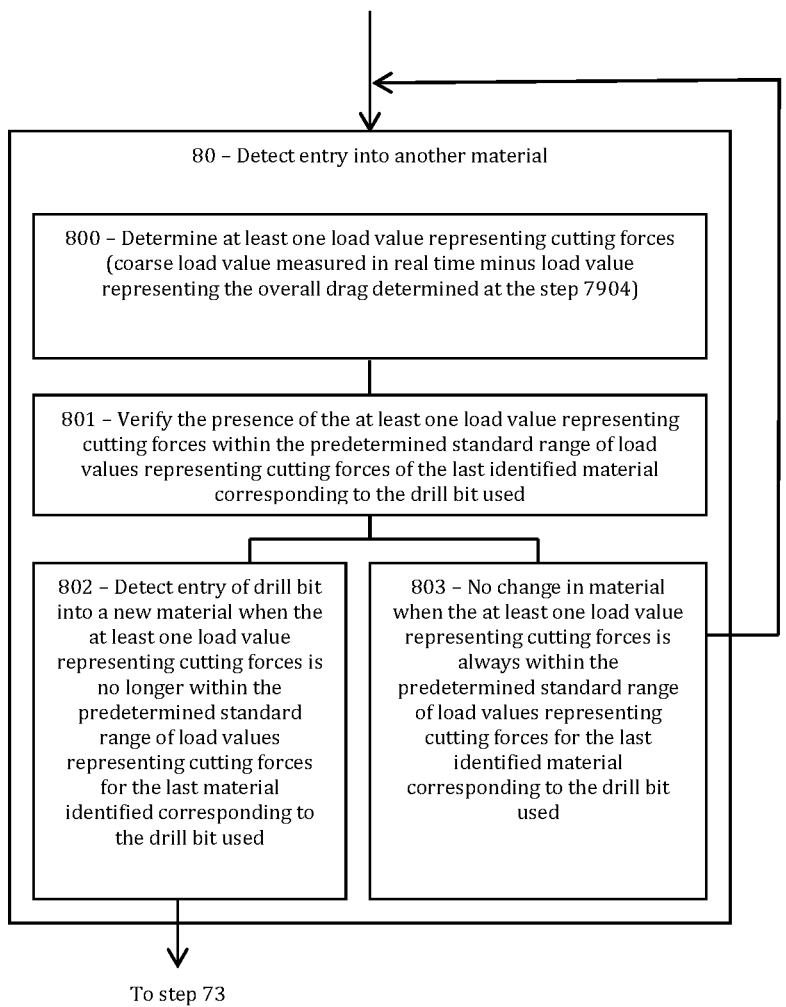

The tables 1 to 9 illustrate tables of data considered during the implementing of an example of a method according to the invention.

6. DESCRIPTION OF PARTICULAR EMBODIMENTS

6.1. Device

A drilling device or drill for implementing a method according to the invention comprises a drill or a drilling robot with controlled cutting parameters. Such a drilling device is known per se to those skilled in the art and is not described in detail apart from the elements more specific to the invention.

As is illustrated in FIGS. 1a and 1b, such a drilling device 10 comprises a casing 11.

The casing 11 has a first casing portion 110 and a second casing portion 111 that extend substantially perpendicularly to one another. In one variant, the casing could extend along a single axis and thus not have an essentially T shape.

The drill comprises an output spindle 12 that is mobile in rotation and in translation along one and same axis. This output spindle 12 is linked by one or more transmission chains to driving means.

In this embodiment, the drive means comprise:
- an electric rotational drive motor 14 linked to the output spindle 12 by a transmission chain 15 enabling the rotational driving of the output spindle 12 and therefore that of the drill bit 13 that is fixedly attached thereto, and
- an electric feed motor 16 linked to the output spindle 12 by a transmission chain 17 enabling the driving in translation of the output spindle 12 and therefore of the drill bit that is fixedly attached thereto.

The rotational driving and the feed drive are achieved along one and the same axis. Such a principle is described especially in the document FR3000693.

The drilling device comprises a removable drilling head 301. This drilling head 301 corresponds to the second casing portion 111. Reversible mechanical and electrical linking means 303 are classically used between the removable drilling head 301 and the first casing portion 111 (i.e. the body of the drill).

This head comprises a memory 135 such as for example an RFID chip or any other appropriate data-storage means. The first casing portion 110 therefore comprises a reader 25 capable of reading the information contained in the memory associated with the drilling head 301.

The load on the drill bit in air of a drilling device results essentially from the friction that takes place inside the removable drilling head and the rest of the casing.

The head comprises means for the fixed attachment 20 of a cutting tool 13, for example a drill bit, placed at the extremity of the output spindle 12. These fixed attachment means can for example include a drill bit clamp. Clearly, these means of fixed attachment can enable the fixed attachment of a plurality of different drill bits to the drill.

During the service life of the drill bit, the pieces of information on the drill bit are carried by the memory integrated into the head.

In one variant, it can be planned that the memory will be integrated directly into the drill bit.

In these two variants, it will be said that the memory is associated with the drill bit, whether it is integrated into its tool holder or directly into the drill bit.

One alternative to an RFID label could be an electronic memory connected to the controller of the drill by electric connectors.

The drill is connected to a controller 19 by a cable that classically comprises power supply wires 210 for the motors and, if necessary, communications wires 211. It could also possibly include tubes for the passage of fluids such as lubricant.

According to the exemplary embodiment illustrated in FIG. 2, the controller 19 comprises a random-access memory (RAM) 180, a processing unit 181 equipped for example with a processor and driven by a computer program, comprising program code instruction for the execution of the method of drilling according to the invention, this program being stored in a read-only memory (ROM) 182. The controller also comprises a wired or wireless sending/receiving module 188 enabling communication with the drill and possibly with other apparatuses such as a computer network, this sending/receiving module comprising:

- a receiver to receive signals delivered by the different measuring means (sensor) integrated into the drill;
- a transmitter to send commands to the drill.

The drill also comprises a sending/receiving module (not shown) to communication with the controller.

The controller also comprises an input/output interface 193, a user interface to manage command introduction means 194 (keyboard, touchscreen, mouse etc.), a display means 195 (screen, display unit, indicator light) and, if need be, means for sending out a sound signal on an audible frequency 196.

The input/output interface can enable the programming of drilling strategies. The drill can itself integrate a man/machine interface 24 used to start the drilling and view information on the progress of the drilling operation.

This controller 19 comprises two power supply units 191, 192 used to power the drill bit rotational drive motor 14 and the feed motor 16. These power supply units can for example be inverters adapted to powering synchronous permanent magnet motors. These motors are provided with an angle sensor 141, 161 of which the signal representing the angle of the rotor relative to the stator is used by the inverters to accurately power the synchronous motors.

The controller 19 comprises a connector 196 for connection to an electric current power source. The controller is dissociated from the drill. In one variant, it could be integrated into the drill, i.e. housed within the casing of the drill.

At initialization, the code instructions of the computer program are for example loaded into the random-access memory 180 and then executed by the processor of the processing unit 181. The random-access memory 180 contains especially the appropriate formulae for computing the different variables and magnitudes determined during the implementation of the method. The processor of the processing unit 181 carries out the different computations needed. It can then for example display the result, record it, transmit it to a network, compare it with one or more predetermined threshold values and, as the case may be, drive the screwing device accordingly and send out a visual alarm and/or sound alarm if need be.

FIG. 2 illustrates only one among several possible ways of making a controller so that it carries out the steps of the drilling method according to the invention (and in any one of the different embodiments, or in a combination of these embodiments). Indeed, these steps can be carried out equally well on a reprogrammable computation machine (a PC computer, a DSP processor or a microcontroller) executing a program comprising a sequence of instructions or on a dedicated computation machine (for example a set of logic gates such an FPGA or an ASIC or any other hardware module).

Should the controller be made with reprogrammable computation machine, the corresponding program (i.e. the sequence of instructions) could be stored in a storage carrier that could be detachable (for example a floppy disk, CD-ROM or a DVD-ROM) or non-detachable, the storage carrier being partially or totally readable by a computer or a processor.

The device comprises means for measuring at least one piece of information representing the load on the drill bit during a drilling operation.

This piece of information or these pieces of information comprise one or more combinations of several pieces of information from the following group:

- torque applied to the drill bit along its axis of rotation;
- axial thrust force applied to said drill bit;
- electric current or power consumed by at least one of the motors of said drilling device, said drilling device comprising a motor for the rotational driving of the drill bit and a motor for the driving of said drill bit in translation.

The means for measuring at least one piece of information representing the load on the drill bit during a drilling operation therefore comprise one or the combination of several of the following means:

- a torque sensor 22 applied to the drill bit along its axis of rotation;
- an axial thrust sensor 23 capable of measuring the force applied to the drill bit along its axis of rotation;
- a sensor of the current or electric power 1910 consumed by at least one of the motors.

These motors are connected to the controller 19 so that their signals can be processed.

The device comprises means for determining at least one load value representing the overall drag due to the internal friction of said drilling device and to the friction of said drill margins in said element to be drilled, these means for determining comprising:

- means for stopping the drilling operation in progress;
- means of partial retraction of said cutting tool on a predetermined distance, said predetermined distance being chosen in such a way that said cutting edges are no longer in contact with said element to be drilled;
- means for driving said cutting tool with predetermined cutting parameters;
- means for measuring at least one load value during the driving of the said cutting tool with said cutting parameters before its cutting edges again come into contact with said element to be drilled and after stabilization of said load values said at least one load value measured representing said overall drag.

The device comprises means for determining at least one load value representing the drag of the drill margins due to the friction of said drill margins in said element to be drilled, these means comprising:

- means for determining at least one load value representing the drag of said drilling device due to the internal friction of said drilling device working with said predetermined cutting parameters;
- means for the subtraction, from said at least one load value representing the overall drag, of said at least one load value representing the drag of said drilling device, the result of said subtraction being equal to said at least one load value representing the drag of the drill margins.

The drilling device comprises means for determining at least one load value representing cutting forces generated by the removal of material from said element to be drilled during a drilling operation, these means comprising:

means for measuring at least one load value during the drilling of said element to be drilled with said predetermined cutting parameters;

means of subtraction, from said at least one load value measured during the operation for drilling said element to be drilled, of said at least one load value representing said overall drag, the result of said subtraction being equal to said at least one load value representing cutting forces.

The device comprises means for activating predetermined reference cutting parameters specific to the group of materials to which the material being drilled belongs and to the type of drill implemented to carry out the operation of drilling in progress, and means for comparing said at least one load value representing cutting forces with predetermined ranges of reference load values representing cutting forces, each of said ranges being specific to one of the materials of said group.

The device comprises means for stopping the drilling operation in progress and/or sending a warning signal when said at least one load value representing cutting forces does not belong to any of said ranges of reference load values representing cutting forces.

The drilling device comprises means to verify the friction of said drill margins comprising:

means for comparing said at least one load value representing the drag of the drill margins with a predetermined threshold value;

means for detecting an abnormal friction of said drill margins when said at least one load value representing the drag of the drill margins becomes greater than said predetermined threshold value.

The controller is programmed to activate an unjamming operation when it is detected that the friction of the drill margins is abnormal.

An unjamming, during a drilling operation, consists in making the drill bit carry out a retraction while maintaining its rotational drive, and then in driving it again in the drilling direction. This is done to remove the chips from the hole being drilled.

The drilling device comprises means for verifying cutting forces comprising means for comparing said at least one load value, representing cutting forces, with a standard range of predetermined material-cutting load values specific to the material being drilled for a drill bit, the cutting edges of which have the minimum quality required for accurate drilling and for said predetermined material-cutting parameters.

The drilling device comprises means for detecting abnormal cutting forces when said at least one load value representing cutting forces is not included in said standard range of material-cutting load values.

The drilling device comprises means for identifying the material being drilled, said means for identifying comprising:

means to activate or maintain predetermined reference cutting parameters specific to the group of material or materials to which the material being drilled belongs and to the type of drill bit implemented to carry out the drilling operation in progress;

means for determining the material being drilled, said material being drilled being the one for which the range of reference load values representing cutting forces contains said at least one load value representing the cutting forces;

means for activating predetermined material-cutting parameters specific to the material identified at said step for determining and to said type of drill bit implemented;

means for determining at least one load value representing cutting forces with said material-cutting parameters;

means for validating the material identified during said step for determining, said determining of the material being validated when the at least one load value representing the cutting forces, determined in implementing said material-cutting parameters, belongs to an range of load values representing predetermined cutting forces with said material-cutting parameters for the material identified.

The controller is programmed to stop the drilling operation when it is detected that the cutting forces are abnormal or that no material is identified.

The controller is programmed to generate the sending of a warning signal when it is detected that the friction of the drill margins is abnormal and/or when it is detected that the cutting forces are abnormal and/or that no material is identified.

The different means for measuring and determining comprises especially the controller and the sensors needed.

6.2. Method 6.2.0. Introduction

According to the preferred mode of implementing the invention, a drill bit is associated during its service life with a detachable or removable drilling head, this head comprising a memory containing information on the drill bit. The drilling system then comprises a detachable-head drill and a removable or detachable drilling head.

According to one variant, the drilling system could include a drill with integrated head provided with a memory. In this case, the drill bit is associated with a memory of the drilling system.

A device according to the invention can furthermore be implemented to carry out the drilling of elements formed by stacking of successive layers of different materials, each stack constituting a group of materials.

Several types of drill bits can be used in production, with several types of drilling devices and several different materials forming one or more groups of materials that can be drilled in production.

Prior to the implementation of a drilling method according to the invention, there is a preliminary evaluation of the drilling equipment (drilling systems (drill with detachable or integrated head, and as the case may be a removable drilling head) and of the cutting tools) and then a preparation of the drilling equipment before they are sent into production.

The preliminary evaluation is done in laboratory conditions, i.e. without production. Its purpose is to determine standard values or standard ranges of values proper to the types of drilling equipment likely to be used in production.

These standard values (or standard ranges of values represent forces or loads that the equipment will undergo or generate under nominal conditions of drilling. They are evaluated in the laboratory once for each given type of material in a nominal state of use. These values are supposed to represent all equipment of the same type in the same nominal state used in production. They then serve as standard values for driving the drilling in production.

The data collected during this laboratory evaluation is then used by the tooling department of a production unit during the preparation of the drilling equipment before it is sent into production. The tooling department which classically manages the fleet of drilling equipment within the production unit then records the standard values and ranges of standard values needed to carry out the drilling operations in the memories of the drilling equipment.

6.2.1. Preliminary Laboratory Evaluation

In the case of a drilling system with removable drilling head, the preliminary laboratory evaluation relates firstly to each type of drill with removable head and secondly to the pair formed by a type of drill bit associated with a type of removable head.

This evaluation relates to the different types of detachable-head drills and to different types of drill bits, associated with their drill head or drilling head, that may belong to different types.

A type of drill bit is especially characterized by its shape, its material, its coating, its diameter etc.

A type of removable drilling head is especially characterized by its transmission, its dimensions, its efficiency etc.

A type of removable or integrated drilling head is especially characterized by its transmission, its dimensions, its efficiency etc.

In the case of a drilling system using a drill with integrated head, the preliminary laboratory evaluation relates to the drill provided with a drill bit.

The laboratory evaluation is aimed especially at assessing the following "standard" values:
  reference load values representing cutting forces proper to the use of reference cutting parameters for a given drill bit and to least one given material, and associated standard tolerance ranges;
  load values representing material-cutting forces proper to the use of material-cutting parameters for a given drill bit and to at least one given material, and associated standard tolerance ranges;
  maximum standard load values representing the drag of the drill margins proper to the use of reference cutting parameters for a drill bit and a given restrictive material;
  load values representing the drag of the drilling system:
    drill with integrated head, or
    detachable-head drill and removable drilling head.

The cutting parameters comprise one parameter or a combination of several parameters, from among the following:
  cutting speed;
  feed rate;
  rotation frequency;
  type and level of lubrication;
  suction of chips;
  amplitude and frequency of the vibrating drilling component.

These measurements are made on the one hand with new drill bits and on the other hand with worn-out drill bits. A drill bit is considered to be worn out when it has made approximately 80% of the holes that it is capable of making with a satisfactory level of precision.

The drills used are in the "run-in" state, i.e. they have reached the level of use corresponding to about 10% of their service life.

The materials are the same as those used in the building of structures that should be drilled in production.

i. Evaluation of Drilling System i.1. Load values representing the drag of the drilling system A preliminary system for the laboratory valuation of a drilling system comprises the determining, for each type of drilling system, of load values representing the drag of the drilling system:
  drag of the drill with integrated head, or
  drag of the drill with detachable head and drag of the removable drilling head.

A preliminary step of laboratory evaluation of at least one load value representing the drag of the drilling system due to friction internal to this system (transmission and motor) is implemented for each type of drilling system.

A type of drilling system is defined by:
  its design including its lubrication;
    transmission ratio;
    characteristics of the transmission elements;
    inertia of the components;
  its state of use.

The drilling system can be of the detachable head type: it then comprises a drill and a removable drilling head.

The drilling system may be of the type with integrated head: the drill and its head form a monoblock unit.

In the case of a detachable-head drill, this drill (i.e. its body) will preferably be tested alone so as to determine at least one piece of information representing the drag of the drill without the removable head. The removable drilling heads will be tested on a drill without an already tested removable head so as to determine at least one piece of information representing the drag of the removable head. During a drilling operation carried out with a drill associated with a removable head, the at least one load value representing the drag of the drill will then be equal to the sum of the at least one load value representing the drill without removable head and the at least one load value representing the removable head.

In another variant, the at least one load value representing the drag could be not taken into account if it is negligible, i.e. lower than 5% of the at least one load value measured during drilling into solid material.

Different strategies of evaluation of the load values representing the drag of the drilling system are envisaged, for one type of drill, one type of head and given cutting parameters (in this case it is the reference parameters that are used). These strategies are applied in the laboratory for the evaluation of "standard" values. These strategies are classified from the most simple to the most complex.

These different strategies are implemented in applying reference cutting parameters.

i.1.1. Strategy 1

At least one load value is measured without load on the drill bit, whether axial or torque for a given spindle exit length, and is recorded as a load value representing the drag of the drilling device.

In this case, the measurement of at least one load value is carried out in making the drill operate idly in applying the reference cutting parameters corresponding to the type of drill and to the group of materials considered.

i.1.2. Strategy 2

The drag of the drilling device can vary according to the exit length of the spindle of the drill.

At least one load value is measured for several spindle exit lengths, without load on the drill bit, whether axial or torque, and is recorded as a load value representing the drag of the drilling system. Curves indicating the relationship between the at least one load value representing the drag of the drilling system and the exit length of the spindle are used.

In this case, the progress is recorded as a function of the exit length of the spindle of the body of the drill, at least one load value representing the drag of the drill in making the drill operate idly according to the reference parameters.

i.1.3. Strategy 3

The strategy 3 is identical to the strategy 2 but with a calibrated load applied to the drill bit (torque and axial force) representing an average drag of the drill margins of the drill bit on the walls of a hole.

In this case, the recording of at least one load value representing the drag of the drill is measured no longer in making the drill work idly but in making it work while subjecting the spindle to a calibrated load, the value of which is preferably of the order of that of the drag load of the drill. This variant ensures that the measurement of at least one load value representing the drag of the drill is carried out while the internal components of the drill assumed to be in contact in normal operation are effectively in contact (for example the transmission gears etc.).

This strategy improves precision.

i.1.4. Strategy 4

Other parameters can affect the drag of the drilling system such as the temperature of the drill or the number of drilling cycles performed by the drilling system.

The strategy 4 is identical to the strategy 3 but with coefficients that weight the influence of temperature of the drilling system and/or its wear and tear as a function of the number of drilling cycles performed.

In this case, it is possible to record the progress of at least one of the load values representing the drag of the drilling device as a function of the exit length (or length of extension) of the spindle from the body of the drill and/or the temperature of the drill and/or the number of drilling cycles of the drill, in making the drill work idly or in subjecting its spindle to a calibrated load.

i.1.5. Alternative

As an alternative to these strategies 1 to 4, the at least one load value representing the drag of the drilling system could be measured at the start of drilling during a phase making the drill bit approach the approach air. This alternative shall be described further below in the paragraph on the application of the method in production.

ii. Evaluation of Drill Bits Each Associated with a Detachable Head

A preliminary step for the laboratory evaluation 50 of the drill bits comprises the determining, for each type of drill, of:

reference load values representing cutting forces on the cutting edges of the drill bit for each material drilled by a given drill bit with predetermined reference cutting parameters and corresponding standard tolerance ranges (step 51);

load values representing material-cutting forces on the cutting edges of the drill bit for each material drilled by a given drill bit with predetermined material-cutting parameters and corresponding standard tolerance ranges (step 52);

maximum standard load values representing the drag of the drill margins for the restrictive material of each group of materials drilled with a given drill bit (step 53).

ii.1. Reference Load Values Representing Cutting Forces

A preliminary step 51 for laboratory evaluation of reference load values representing cutting forces is carried out for each type of drill bit and each of the materials for each of the given groups of materials that could have to be drilled, including air.

Air is considered to be a material to be drilled inasmuch as, before entering an element to be drilled, the drill is situated in the ambient air called exit air.

This step 51 comprises:

the determining 510 of reference cutting parameters for said type of drill as a function of the materials of said group of materials: these reference parameters are the binding cutting parameters for a given group of materials, i.e. they are cutting parameters based on the values of cutting speed and feed rate of the material or materials dictating a minimum or a maximum limit values, beneath or above which a major drawback appears such as premature wear and tear of the cutting edges of the drill bit. These are proper to a type of drill bit and to a group of materials;

the drilling 511 of each of the materials with a drill bit of said type in implementing the reference cutting parameters corresponding to said drill bit and to said group of materials;

the measurement 512, during these drilling operations, of at least one coarse load value on said drill bit;

the determining 513 of at least one load value representing an overall drag comprising, during each of these drilling operations:

the stopping 5130 of said drilling operation in progress;

the partial retraction 5131 of the cutting tool on a predetermined distance, said predetermined distance being chosen in such a way that said cutting edges are no longer in contact with said element to be drilled;

the driving 5132 of the cutting tool with the reference cutting parameters corresponding to said drill bit and said material;

the measurement 5133 of at least one load value during the driving of the cutting tool before its cutting edges again come into contact with the element to be drilled and after stabilization of the at least one measured load value, the at least one measured load value representing said overall drag;

the subtraction 514, from each coarse load value on said drill bit, of the load value representing the overall drag, the result obtained corresponding to reference load values representing cutting forces for the material considered;

the repetition 515 of the steps 511 to 514 for an equal number of times with new drill bits and used drill bits;

the definition 516, with said results obtained, of a standard tolerance range for at least one reference load value representing the cutting forces of each material: this range is defined so as to cover the variations of material load due to the variations in the characteristics of the material, the drill bit and the head, and due to the vibration phenomena and to slight variations in the speeds of the motors. The use of new drill bits and used drill bits makes it possible to efficiently take into account the variability of the load values resulting from greater or lesser wear and tear of the cutting edges and thus determine significant standard ranges.

ii.2. Load Values Representing Material-Cutting Forces

A preliminary step 52 for the laboratory assessment of load values representing material-cutting forces is implemented for each type of drill bit and each of the materials that could have to be drilled, including approach air and exit air. This step comprises:

the determining 520 of the cutting parameters for said type of drill bit for each material: these enable optimal drilling for each of the materials with the type of drill bit considered;

the drilling 521 of each of the materials with a drill bit of said type in implementing the cutting parameters corresponding to said drill bit and to said material;

the measurement 522 during these drilling operations of at least one coarse load value on said drill bit;

the determining 523 of at least one load value representing an overall drag comprising, during each of these drilling operations:

the stopping 5230 of said drilling operation in progress;

the partial retraction 5231 of the cutting tool over a predetermined distance, said predetermined distance being chosen in such way that said cutting edges are no longer in contact with said element to be drilled;

the driving 5232 of the cutting tool with the cutting parameters corresponding to said drilling head and said material;

the measurement 5433 of at least one load value during the driving of the cutting tool before the drilling edges again come into contact with the element to be drilled, the at least one load value measured representing said overall drag;

the subtraction 524, from each coarse load value on said drill bit, of the overall drag load value, the result obtained corresponding to load values representing cutting forces of the material considered;

the repetition 525 of the steps 521 to 524 for an equal number of times with new drill bits and used drill bits;

the definition 526, with said results obtained, of a standard tolerance range for at least one load value representing cutting forces for each material: this range is defined so as to cover the variations of material load due to variations of the characteristics of the material, the drill bit and the head and due to vibration phenomena and to slight variations in the speed of the motors. The use of new and used drill bits makes it possible to efficiently take account of the variability of the load values results from greater and lesser wear and tear of the cutting edges and thus determine significant standard ranges.

ii.3. Maximum Standard Load Values Representing the Drag of the Drill Margins

A preliminary step 53 for the laboratory evaluation of at least one maximum standard load value representing the drag of the drill margins is carried out for each type of drill and for the most restrictive material of each group of materials that might have to be drilled. It comprises:

the determining 530 of reference cutting parameters for said type of drill as a function of the materials of said group of materials: these reference cutting parameters are the restrictive or binding cutting parameters for a given group of materials, i.e. they are the cutting parameters based on the cutting and feed rate of the material or materials dictating minimum or maximum boundary values below or above which a major drawback appears such as premature wear and tear of the cutting edges of the drill bit. They are proper to a type of drill bit and to a group of materials;

the drilling 531 of the restrictive material of the group of materials considered on a predetermined depth (about one-and-a-half times the diameter) with a drill bit of said type in implementing the cutting parameters for the restrictive material corresponding to said drill bit and to said group of materials considered;

the partial retraction 532 of the drill on a predetermined distance, said predetermined distance being chosen in such a way that said cutting edges are no longer in contact with said element to be drilled (about 0.5 to 1 mm);

the application 533 of the reference cutting parameters to the drilling head during a "non-cutting feed travel";

the measurement 534 of at least one load value during the "non-cutting feed travel", after stabilization at the start of travel and before the edges of the drill bit could plunge back into the material because of the amplitude of the vibration feed at the end of travel. This at least one load value represents the overall drag (drilling system and drill margins);

the obtaining 535 of at least one load value representing the drag of the drilling system (according to one of the strategies mentioned here above in the context of the qualification of the drilling system);

the computation 536 at least one load value representing the drag of the drill margins, each load value representing the drag of the drill margins being equal to a load value representing the overall drag minus a load value representing the drag of the drilling system;

the repetition 537 of at least one of the same preceding operations with other new and used drill bits of the same type;

the computation 538 of the average of said load values representing the drag of the drill margins, increased by a coefficient of 50%, the result obtained corresponding to a maximum standard load value that the drag of the drill margins must not surpass.

iii. Data Derived from the Laboratory Evaluation

The values obtained during the previous laboratory evaluations are recorded in a data bank to enable the parametrizing of the drilling system to be used in production on applications characterized by:

a type of drill bit;

a type of material to be drilled;

a drilling head and a drill body in the case of a detachable-head drill or a drill with integrated head.

The previously evaluated values are therefore assembled in the form of tables needed for parametrizing each application.

Thus, for each application defined, there is:

a table of the table 1 type listing the elements that characterize the application;

a table of the table 2 type assembling reference cutting parameters of the application;

a table of the table 3 type assembling, for each material of the group of materials of the application, the reference load values representing cutting forces (reference loads under reference cutting parameters), the material-cutting parameters, the load values representing material-cutting forces (cutting loads under material-cutting parameters);

and in the case of a drill with detachable head:

a table of the table 4 type assembling, for each strategy described in the paragraph on preliminary laboratory evaluation, the load values representing the drag of the detachable drilling head (reference loads under reference cutting parameters);

a table of the table 5 type assembling, for each strategy described in the paragraph on preliminary laboratory evaluation, the load values representing the drag of the body of the drill with detachable head (reference loads under reference cutting parameters);

or in the case of a drill with integrated head:

a table of the table 6 type assembling, for each strategy described in the paragraph on preliminary laboratory evaluation, the load values representing the drag of the body of the drill with integrated head (reference loads under reference cutting parameters).

TABLE 1

Constituent elements of an application

| Drilling device constituted by: | Type of drill bit | A |
| --- | --- | --- |
| | Drilling head | B |
| | Body of drill with head | C |
| | Drill with integrated head | / |
| Group of materials constituted by: | | Mat 1 |
| | | Mat 2 |
| | | Mat 3 |
| | | Approach air |
| | | Cover air |
| | | Exit air |

TABLE 2

Reference cutting parameters

Travel of start measurement
Travel of end measurement
Rotation speed
Feed per turn
Lubrication
Vibratoryn drilling

TABLE 3

Parameters relating to the drill bit and recorded in the memory integrated into the detachable head or the drill with integrated head

| | Reference load values representing cutting forces | | | | Material-cutting parameters | | | | Load values representing material-cutting forces | |
| --- | --- | --- | --- | --- | --- | --- | --- | --- | --- | --- |
| | Cutting torque on cutting edges | Cutting thrust on cutting edges | Drill margin drag torque | Drill margin drag thrust | Rotation speed | Feed per rotation | Lubrication | Vibratory drilling | Cutting torque on cutting edges | Cutting thrust on cutting edges |
| | min max | min max | max | max | | | | | min max | min max |
| Mat 1 | | | | | | | | | | |
| Mat 2 | | | | | | | | | | |
| Mat 3 | | | | | | | | | | |
| Approach Air | | | | | | | | | | |
| Yock air | | | | | | | | | | |
| Exit air | | | | | | | | | | |

TABLE 4

Parameters relating to the detachable drill head recorded in its memory
Load values representing the drag of the drill head

| | Nominal drag torque | Nominal drag thrust |
| --- | --- | --- |
| Strategy 1 or | Ctnom (fixed value) | Ptnom (fixed value) |
| Strategy 2 or | Torque = f (lg) | Thrust = g (lg) |
| Strategy 3 or | Torque = h (lg) | Thrust = i (lg) |
| Strategy 4 | Torque = j (lg; T°c; nb cycles) | Thrust = k (lg; T°c; nb cycles) | lg = spindle exit lenght
nb cycles = number of drilling cycles carried out by the drill and characterizing its wear and tear.

TABLE 5

Parameters relating to the body of a drill with detachable head recorded in its memory
Load values representing the drag of the body of the drill with detachable head

| | Nominal drag torque | Nominal drag thrust |
| --- | --- | --- |
| Strategy 1 or | Ccnom (fixed value) | Pcnom (fixed value) |
| Strategy 2 or | Torque = l (lg) | Thrust = m (lg) |
| Strategy 3 or | Torque = n (lg) | Thrust = o (lg) |
| Strategy 4 | Torque = p (lg; T°c; nb cycles) | Thrust = q (lg; T°c; nb cycles) |

TABLE 6

Parameters relating to a drill with integrated head recorded in its memory
Load values representing the drag of the drill with integrated head

| | Nominal drag torque | Nominal drag thrust |
| --- | --- | --- |
| Strategy 1 or | Ccnom (fixed value) | Pcnom (fixed value) |
| Strategy 2 or | Thrust = l (lg) | Thrust = m (lg) |
| Strategy 3 or | Thrust = n (lg) | Thrust = o (lg) |
| Strategy 4 | Thrust = p (lg; T°c; nb cycles) | Thrust = q (lg; T°c; nb cycles) |

6.2.2. Preparing the Equipment for Production

The tables from the laboratory evaluation are made available as digital files to the company's tooling department so that it can prepare the equipment for drilling before production.

The tooling department is in charge of storing and preparing the drilling equipment (drilling system and cutting tool) for its use in production.

Thus, whenever the tooling department receives a new drilling system component (drill with integrated head, drill body with detachable head, and detachable drilling head), the operator loads the following into a memory of the drill body or into the detachable head or into the drill: the different applications envisaged in which where this component can be used as well as, for each of these applications, the corresponding digital files (or tables of values).

The memory of a drill body will therefore receive the tables of the table 5 type for the different applications where this body is likely to be used, as well as tables of the table 8 type listing the different applications where this body is used and, for each of these applications, the corresponding table 5.

TABLE 8

| Drill body memory | |
|---|---|
| Application | Table 15 |
| 1 | |
| 2 | |
| 3 | |
| 4 | |
| 5 | |

The memory of a detachable head will therefore receive the tables of the tables 2, 3 and 4 type of the different applications where this head is likely to be used as well as a table of the table 7 type listing the different applications where this detachable head is likely to be used and, for each of these applications the corresponding tables 2, 3 and 4.

TABLE 7

| Detachable memory head | | | |
|---|---|---|---|
| Application | Table 12 | Table 13 | Table 14 |
| 1 | | | |
| 2 | | | |
| 3 | | | |
| 4 | | | |
| 5 | | | |

The memory of a drill with integrated head will therefore receive the table 2, 3. and 6 type tables of the different applications where this drill can be used as well as table 9 type table listing the different applications where this drill with integrated head is likely to be used and for each of these applications the corresponding type 2, 3 and 6 type tables.

TABLE 9

| Memory of drill with integrated head | | | |
|---|---|---|---|
| Application | Table 12 | Table 13 | Table 16 |
| 1 | | | |
| 2 | | | |
| 3 | | | |
| 4 | | | |
| 5 | | | |

In one variant, these parameters can be stored in the memory of the drill.

In another variant, these parameters can be stored on a company server which the drill can access by a radio communication.

Similarly, when the laboratory department publishes the files of values needed for a new application or a correction of the values of an existing application, the operator of the tooling department will update the memories of the components of the drilling systems.

When the operator of the tooling department receives a preparation request for a given application, he takes out the following from his store: the drill body, the drilling head (or the drill with integrated head) and the drill bit needed for the application, assembles these components and places the drilling system thus constituted at the disposal of the production department.

6.2.2. Application of the Method in Production

In order to carry out an operation for drilling an element comprising a stack of a succession of layers of different materials forming a group of materials, the production department procures the drilling system suited for its application from the tooling department.

During use of the drilling system, the production operator makes a selection, through the man/machine interface of the drilling system, of the application concerned. The controller of the drilling system will then make a search, in the memories of the body of the detachable-head drill and of the detachable drilling head (or of the drill with integrated head), for the values of the tables 2, 3, 4, 5, 6 corresponding to this application.

The drilling operation is then performed according to the pre-programmable application selected in the controller 19.

During the implementation of the method, i.e. during all the phases for shifting the drill in a material including the approach air and exit air, a measurement is made, preferably continuously (in real time), of at least one coarse load value on the drill. This operation can consist of the measurement of one or more parameters, among them the torque transmitted to the drill via the sensor 22, the axial thrust transmitted to the drill via the sensor 23, the power or the electric current consumed by at least one of the rotational or translation drive motors via the sensor 1910. A coarse load value is therefore the one delivered by a sensor. This value is then used to determine physical variables used in the context of the regulation of the drilling operation.

During the shifting of the drill in the approach air before its cutting edges enter the paths to be drilled, the at least one coarse load value measured after stabilization actually represents essentially internal friction of the drilling system since the friction of the drill margins in the approach air is negligible.

The drill 13 is driven towards the part to be drilled during an approach phase 71.

During an optional step 711, the drill is driven with the reference cutting parameters. The at least one coarse load value measured in real time, before the cutting edges enter the part to be drilled, represents the drag of the drilling system. This value is registered in the memory of the system (step 712). The implementing of these steps 711 and 712 therefore makes it possible to avoid the determining, in the laboratory, of at least one load value representing the drag of the drilling system according to one of the strategies 1 to 4 described here above in the paragraph on the preliminary laboratory evaluation and the recording of this value by the tooling department in the memory of the drilling system.

During a step 713, the drill is driven according to the cutting parameters of the approach air that are predetermined and recorded in its memory. These cutting parameters can for example include a rotation frequency, a feed rate etc (see table 3).

The measurement of at least coarse load value during the moving of the drill bit in the approach air, with the approach air cutting parameters, before the cutting edges enter the part to be drilled, constitutes a step for measuring at least one load value representing the drag of the drilling system working with the cutting parameters for the approach air. This value is recorded in the memory of the system (step 714).

The determining of at least one load value representing the drag of the drilling system with the cutting parameters for the approach air and the determining of at least one load value representing the drag of the drilling system with the reference cutting parameters can be combined into a single step:
- if the rotation speed of the drill bit during the approach phase is chosen like that of the reference cutting parameters, and
- if, in the progress of the method, the only load value taken into consideration is the one relating to the cutting torque.

The method comprises a step 72 for detecting the entry of the drill bit 13 into the element to be drilled.

In this embodiment, this step comprises:
- the determining 720 of at least one load value representing cutting forces in the approach air corresponding to the subtraction, from of the at least one coarse load value measured in real time during the shifting of the drill in the approach air, of the at least one load value representing the drag of the drilling device working with the cutting parameters for the approach air determined at the step 714;
- the verification 721 of the presence of the at least one load value representing cutting forces in the approach air within the predetermined standard range of load values representing cutting forces in the approach air corresponding to the drill bit,
- the detection 722 of the entry of the drill bit into the element to be drilled when the at least one load value representing cutting forces in the approach air is no longer within the predetermined standard range of load values representing cutting forces in the approach air;
- the non-detection 723 of the entry of the drill bit into the element to be drilled when the at least one load value representing cutting forces in the approach air remains within the predetermined standard range of load values representing cutting forces in the approach air.

If it is detected that the drill bit has not entered the part to be drilled, the drilling method continues until it is detected that the drill bit has entered the part to be drilled.

The sequencing of the sub-steps of the step 72 is a verification loop repeated at a frequency of several kilohertz corresponding to the computation frequency of the controller.

When it is detected that the drill bit has entered the part to be drilled, which can be likened to a change of material (passage from approach air to the first layer of material of the element to be drilled), a step for verifying a real change of material is implemented during which the reference cutting parameters corresponding to the type of drill used and to the group of materials being drilled are activated.

The step comprises a step 73 for verifying the friction of the drill margins comprising:
- the measurement 730 of at least one load value representing the overall drag due to the friction of the drilling system and the friction of the drill margins;
- the determining 731 of at least one load value representing the drag of the drilling system;
- the determining 732 of at least one load value representing the drag of the drill margins;
- the comparison 733 of the at least one load value representing the drag of the drill margins with the predetermined maximum standard load value of drag of the drill margins corresponding to the group of materials and to the type of drill bit considered.

The measurement 730 of at least one load value representing the overall drag comprises:
- the stopping 7300 of the drilling operation in progress;
- the partial retraction 7301 of the cutting tool on a predetermined distance, said predetermined distance being chosen in such a way that said cutting edges are no longer in contact with said element to be drilled (for example from 0.5 to 1 millimeters);
- the driving 7302 of the cutting tool with the predetermined reference cutting parameters corresponding to the type of drill bit and to the group of materials considered;
- the measurement 7303 of the at least one coarse load value during the driving of the cutting tool with the reference cutting parameters before the cutting edges again come into contact with the element to be drilled, i.e. during a non-cutting feed travel, the at least one coarse load value measured representing the overall drag. This measurement is carried out after stabilization of the load values at the beginning of the shifting of the drill bit. This stabilization is needed because the load values when restarting are subject to fluctuations due to the dynamic effects caused by this restarting operation. This stabilization is obtained at the end of a travel of the drill bit of the order of 0.2 millimeters.

The determining 731 of the at least one load value representing the drag of the drilling system takes account of the values measured and recorded at the optional step 712 of the method or measured in the laboratory according to one of the strategies 1 to 4 described here above and then recorded by the tooling and equipment department before starting production that corresponds to the drill and/or the head used.

If these values are weighted according to the exit length of the spindle from the drill according to one of the strategies 2 to 4, then a step for determining the exit length of the spindle is executed. Such a step is classic and known per se to those skilled in the art.

Then, at least one load value representing the drag of the drilling system is determined as a function of the exit length of the spindle, using curves registered in the memory of the drill.

If other weighting factors are used, such as the temperature of the drill and/or the number of cycles of the drill, then these parameters are measured in a manner known per se to those skilled in the art and the corresponding curves are used to determine at least one load value representing the drag of the drilling system.

The determining 732 of at least one load value representing the drag of the drill margins comprises the subtraction, from the at least one load value representing the overall drag measured at the step 7303, of the at least one load value representing the drag of the drilling system. Naturally, load values of a same physical variable or quantity are subtracted. For example, if the load value measured as representing the overall drag and the load value measured as representing the drag of the drilling system are the axial thrust and the torque, then two load values representing the drag of the drill margins will be obtained, namely one expressed in N (the unit representing the axial thrust) and the other expressed in N.m (the unit representing the torque).

A step 733 carries out the comparison of the at least one load value representing the drag of the drill margins with the maximum standard load value representing the drag of the drill margins corresponding to the group of materials and to the type of drill bit considered.

When the at least one load value representing the drag of the drill margins becomes greater than the maximum standard load value representing the drag of the drill margins corresponding to the group of materials and to the type of drill bit considered, it is deduced therefrom that the friction of the drill margins is abnormal (step 734).

When it is detected 734 that the friction of the drill margin is abnormal (number of consecutive detections of abnormal friction of the drill margins equal to 1), then a step 74 of unjamming is implemented.

The unjamming step 74 is followed by a new step 73 of verification of the friction of the drill margins.

If the friction is again qualified as abnormal (with the number of consecutive detections of abnormal friction of the drill margins being equal to 2), then the drilling is stopped (step 75), the drill is retracted (step 76) and a warning is sent to the operator (step 77) to inform him of the occurrence of an anomaly.

If the friction of the drill margins is qualified as normal (step 735), the drilling method is continued.

A step 78 for determining the material being drilled is executed.

An activation 780 of the predetermined reference parameters recorded in the memory associated with the drill bit and corresponding to the group of the materials concerned is executed, or these parameters are maintained if they have not been momentarily stopped.

At least one piece of information representing the coarse load on the drill bit is measured after a phase of stabilization of this drill bit and complete engagement of the cutting edges (or cutting lip) in the new material (step 781). The phase of measurement can take place over a travel of the drill bit ranging from 0.5 to 1 millimeter.

At least one load value representing cutting forces is computed (step 782). This value is equal to the subtraction, from the at least one coarse load value on the drill bit measured at the step 781, of the at least one load value representing the overall drag determined previously at the step 730.

The at least one load value representing the cutting forces is compared by the controller with the standard ranges of reference load value representing cutting forces recorded in the memory of the drill bit for each of the materials of the group (step 783).

The identified material being drilled is the one for which the range of reference load values representing cutting forces contains the at least one computed load value representing cutting forces (step 784).

If the at least one computed load value representing cutting forces does not belong to any standard range of reference load values representing cutting forces for the different known materials (step 785), then the drilling in progress does not correspond to the drilling of a known material, and this signifies a potential anomaly. The drilling is then stopped (step 75), the drill bit is retracted (step 76) and a warning is sent (step 77) to the operator to inform him that the cutting edges of the drill bit are potentially deteriorated.

Should a known material be identified (step 784) and should the identified material not be the exit air, a step 79 is then carried out for verifying cutting forces of the material identified.

The step 79 for verifying the cutting forces comprises a step 790 for measuring at least one load value representing the overall drag due to the friction of the drilling device and the friction of the drill margins.

The step 790 comprises:
- a step 7901 for stopping the drilling in progress;
- a step 7902 for partial retraction of the drill over a predetermined distance, said predetermined distance being chosen in such a way that said cutting edges are no longer in contact with said element to be drilled (for example this distance ranges from 0.5 to 1 millimeters)
- a step 7903 for driving the drill, with the predetermined cutting parameters corresponding to the drill bit used and to the material identified on a non-cutting feed travel;
- a step 7904 of measurement, during the non-cutting feed phase, of at least one coarse load value before the edges of the drill bit re-enter the material and after stabilization of the load value; these load values represent the overall drag (friction of the drilling system+friction of drill margins).

The step 79 then comprises:
a step 791 for activating or maintaining the cutting parameters of the material corresponding to the drill bit used and to the material identified, then
a step 792 for measuring at least one coarse load value after the stabilization and engagement of the cutting edges of the drill bit into the material: to this end, the drill bit is driven on a first drilling travel distance, for example of the order of 0.2 millimeters, at the end of which the cutting edges of the drill bit are again engaged in the material and the load values are stabilized, and then the measurement is carried out on a second predetermined drilling travel distance, for example ranging from 0.5 to 1 millimeter;
a step 793 for determining at least one load value representing cutting forces computed as being equal to the subtraction, from at least one coarse load value measured at the step 792, of the at least one load value representing the overall drag determined at the step 7904.

The at least one load value representing the cutting forces is compared by the controller with the standard range of load values representing cutting forces recorded in the memory of the drill bit corresponding to the matter identified during drilling (step 794).

If at least one load value representing computed cutting forces does not belong to the range of load values representing cutting forces for the material identified (step 795), there is a potential anomaly. The drilling is then stopped (step 75), the drill bit withdrawn (step 76) and a warning sent (step 77) to the operator to inform him of an anomaly such as the fact that the cutting edges of the drill bit are potentially deteriorated or that an adhesive material or another defect is present.

If the load value representing the cutting forces is within the standard range of load value of the cutting forces for the material identified (step 796), then no anomaly is detected and the drilling continues until entry into another material is detected (step 80).

This step 80 for detecting the entry of the drill bit into a new material during drilling is also called step for detecting a change of material.

This step 80 for detecting a change of material comprises:

a step 800 for determining at least one load value representing cutting forces corresponding to the subtraction, from the at least one coarse load value measured in real time during the shifting of the drill bit in the material being drilled, from the at least one load value representing the overall drag measured at the step 7904;

a step 801 for verifying the presence of the computed value of the at least one piece of information representing the load representing cutting forces within the predetermined standard range of the load representing cutting forces for the last identified material corresponding to the drill bit used, a step 802 for detecting the entry of the drill bit into a new material when the computed value of the at least one load representing cutting forces of the last identified material is no longer within the predetermined standard range of load values representing cutting forces for this material;

a step 803 for detecting an absence of change of material when the computed value of the at least one load representing cutting forces of the last identified material remains within the predetermined standard range of load values representing cutting forces for this material.

If no change of material is detected (step 803), the drilling method is continued until a change of material is detected.

If a new material is detected (step 802), a new step 73 is carried out to verify the friction of the drill margins then a new step 78 is carried out to determine the material being drilled.

When, during the implementation of a step 78 for determining the material being drilled, the identified material being drilled is the exit air, the drilling continues on a predetermined travel distance, for example 3 millimeters (step 81). At the end of this travel, the drill bit is raised (step 82) and an alert signal to the effect that a hole has been drilled is sent to the operator (step 83).

6.2.3. Variants

In one variant, the approach phase for bringing the drill bit in the approach air towards the element to be drilled can be preceded by a possible detection that the drill bit is truly in the approach air:

by applying the reference parameters as soon as the drilling cycle starts;

by computing at least one load value representing cutting forces;

by checking that at least one load value representing cutting forces is truly within the standard range of reference load values representing cutting forces, the drill bit being situated in the approach air if at least one computed load value representing cutting forces is truly situated within the corresponding standard range.

6.2.4. Other Applications

More generally, the invention relates to a method for drilling an element to be drilled by means of a drilling device and cutting tool comprising drill margins and cutting edges, said method comprising a step for determining at least one load value representing the total drag due to the internal friction of said drilling device and the friction of said drill margins in said element to be drilled, this step comprising the following sub-steps:

stopping of said drilling operation in progress;

a partial retraction of said cutting tool over a predetermined distance, said predetermined distance being chosen in such a way that said cutting edges are no longer in contact with said element to be drilled;

driving said cutting tool with predetermined cutting parameters;

measuring at least one load value during the driving of said cutting tool with said cutting parameters before its cutting edges again come into contact with said element to be drilled, and after stabilization of such load values, said at least one measured load value representing said overall drag.

According to one variant, the method comprises a step for determining at least one load value representing the drag of the drill margins due to the friction of said drill margins in said element to be drilled, this step comprising the following sub-steps:

determining at least one load value representing the drag of said drilling device due to the internal friction of said drilling device working with said predetermined cutting parameters;

the subtraction, from said at least one load value representing the overall drag, of said at least one load value representing the drag of said drilling device, the result of said subtraction being equal to said at least one load value representing the drag of the drill margins.

According to another variant, the method comprises a step for determining at least one load value representing cutting forces generated by the removal of material from said element to be drilled during a drilling operation comprising the following sub-steps:

measuring at least one load value during the drilling of said element to be drilled with said predetermined cutting parameters;

subtraction, from said at least one load value measured during the drilling of said element to be drilled, of said at least one load value representing said overall drag.

The invention therefore relates to a method that can be used, during a drilling operation, to measure at least one load value representing the overall drag of a drill and of the drill margins of the drill bit placed at the extremity of its spindle, and if necessary:

at least one load value representing the drag of the drill margins against the walls of an element to be drilled, and/or at least one load value representing the cutting forces.

Such information can be used in various applications other than in which the determining *of a newly encountered material is made reliable as is the case in the embodiment that has just been described.

The friction of the drill margins can be taken into consideration for example to detect a faulty removal of chips (jamming) or the gripping of material on the drill bit.

The cutting forces can be taken into consideration for example to detect wear and tear in the cutting edges of a drill bit or the presence of an adhesive material.

In each of the applications, thresholds will be predetermined in the laboratory for each material and each type of drill bit on the basis of the waiting times after which the following are detected: faulty removal of chips, gripping of material on the drill, wear and tear in the drill bit or the presence of adhesive material.

In production, the surpassing of these thresholds will correspond respectively to the detection of a faulty removal of chips, a gripping of material on the drill, wear and tear in the drill bit or the presence of adhesive material. Naturally, this list of applications is not exhaustive. The different parameters mentioned here above could be considered in the context of other applications.

An exemplary embodiment of the present invention provides an efficient solution to at least certain of the different problems discussed in the background section.

In particular, one embodiment of the invention optimizes the performance of drilling operations, especially to improve the quality of the drilling operations and/or more efficiently manage the use of cutting tools.

In particular, least one embodiment of the invention makes the identification of a material being drilled more reliable.

At least one embodiment makes the detection of the wear and tear of a drill more reliable.

At least one embodiment enables the detection of the existence of jamming by chips during a drilling operation.

At least one embodiment enables the evaluation of the level of friction, either direct friction or friction by faulty removal of chips from the drill margin, between a drill bit and the walls of an element being drilled.

At least one embodiment provides a technique of this kind that is simple and/or reliable.

Although the present disclosure has been described with reference to one or more examples, workers skilled in the art will recognize that changes may be made in form and detail without departing from the scope of the disclosure and/or the appended claims.

The invention claimed is:

1. A method for drilling an element to be drilled by using a drilling device and a cutting tool comprising drill margins and cutting edges, said method comprising:
   a step of determining at least one load value representing overall drag due to internal friction of said drilling device and to friction of said drill margins in the element to be drilled, this step comprising the following sub-steps:
   stopping a drilling operation in progress;
   partial retraction of said cutting tool on a predetermined distance, said predetermined distance being chosen in such a way that said cutting edges are no longer in contact with said element to be drilled while the drill margins are always inside a hole being drilled in the element to be drilled;
   driving said cutting tool with predetermined cutting parameters;
   measuring at least one load value during the driving of said cutting tool with said cutting parameters before the cutting edges again come into contact with said element to be drilled and after stabilization of said load values, said at least one measured load value representing said overall drag.

2. The method according to claim 1 comprising a step of determining at least one load value representing the drag of the drill margins due to the friction of said drill margins in said element to be drilled, this step comprising the following sub-steps:
   determining at least one load value representing the drag of said drilling device due to the internal friction of said drilling device working with said predetermined cutting parameters;
   subtracting, from said at least one load value representing the overall drag, of said at least one load value representing the drag of said drilling device, the result of said subtraction being equal to said at least one load value representing the drag of the drill margins.

3. The method according to claim 2, comprising a step of verifying the friction of said drill margins comprising:
   comparison of said at least one load value representing the drag of the drill margins with a predetermined threshold value;
   detection of abnormal friction of said drill margins when said at least one load value representing the drag of the drill margins becomes greater than said predetermined threshold value.

4. The method according to claim 3 comprising a step of unjamming when it is detected that the friction of the drill margins is abnormal.

5. The method according to claim 1 comprising a step of determining at least one load value representing cutting forces generated by the removal of material from said element to be drilled during a drilling operation, comprising the following sub-steps:
   measuring at least one load value during the drilling of said element to be drilled with said predetermined cutting parameters;
   subtracting, from said at least one load value measured during the drilling of said element to be drilled, said at least one load value representing said overall drag, the result of said subtraction being equal to said at least one load value representing cutting forces.

6. The method according to claim 5 wherein said predetermined cutting parameters are reference cutting parameters specific to the group of materials to which the material being drilled belongs and to the type of drill implemented to carry out the drilling operation in progress, said method comprising a step of comparing said at least one load value representing cutting forces with predetermined ranges of reference load values representing cutting forces, each of said ranges being specific to one of the materials of said group.

7. The method according to claim 6 comprising a step of stopping the drilling operation in progress and/or sending out a warning signal when said at least one load value representing cutting forces belongs to none of said ranges of reference load values representing cutting forces.

8. The method according to claim 5 wherein said predetermined cutting parameters are predetermined material-cutting parameters specific to the material being drilled and to the type of drill bit implemented to carry out the drilling operation in progress, said method comprising a step of verifying cutting forces comprising the comparison of said at least one load value representing cutting forces with a predetermined standard range of material-cutting load values specific to the material being drilled for a drill bit, the cutting edges of which have a minimum quality required for accurate drilling and for said predetermined material-cutting parameters.

9. The method according to claim 8, wherein said step of verifying the cutting forces comprises detection of abnormal cutting forces when said at least one load value representing cutting forces is not within said standard range of material-cutting load values.

10. The method according to claim 5, comprising a step of identifying the material being drilled, said step of identifying comprising:
   a step of activating or maintaining reference cutting parameters specific to the group of materials to which the material being drilled belongs and to the type of drill bit implemented to carry out the drilling operation in progress;
   a step of determining the material being drilled, said material being drilled being the one for which the range of reference load values representing cutting forces contain said at least one load value representing the cutting forces;

a step of activating predetermined material-cutting parameters specific to the material identified at said step of determining and to the type of drill bit implemented;

a step of determining at least one load value representing cutting forces with said material-cutting parameters;

a step of validating the material identified during said step of determining, said determining of the material being validated when the at least one load value representing cutting forces, determined in implementing said material-cutting parameters, belongs to an range of load values representing cutting forces predetermined with said material-cutting parameters for the material identified.

11. A drilling device that is to be implemented to carry out at least one operation for drilling an element to be drilled by using a cutting tool comprising drill margins and cutting edges, said device comprising:

means for determining at least one load value representing overall drag due to internal friction of said drilling device and to friction of said drill margins in said element to be drilled, these means for determining comprising:

means for stopping a drilling operation in progress;

means of partial retraction of said cutting tool on a predetermined distance, said predetermined distance being chosen such that said cutting edges are no longer in contact with said element to be drilled while the drill margins are always inside a hole being drilled in the element to be drilled;

means for driving said cutting tool with predetermined cutting parameters;

means for measuring at least one load value during the driving of said cutting tool with said cutting parameters before its cutting edges again come into contact with said element to be drilled and after stabilization of said load values, said at least one measured load value representing said overall drag.

12. The device according to claim 11 comprising means for determining at least one load value representing the drag of the drill margins due to the friction of said drill margins in said element to be drilled, these means comprising:

means for determining at least one load value representing the drag of said drilling device due to the internal friction of said drilling device working with said predetermined cutting parameters;

means of subtraction, from said at least one load value representing the overall drag, of said at least one load value representing the drag of said drilling device, the result of said subtraction being equal to said at least one load value representing the drag of the drill margins.

13. The device according to claim 12, comprising means for verifying the friction of said drill margins comprising:

means for comparing said at least one load value representing the drag of the drill margins with a predetermined threshold value;

means for detecting an abnormal friction of said drill margins when said at least one load value representing the drag of the drill margins becomes greater than said predetermined threshold value.

14. The device according to claim 13 comprising means to command an unjamming when it is detected that the friction of the drill margins is abnormal.

15. The device according to claim 11 comprising means for determining at least one load value representing cutting forces generated by the removal of material from said element to be drilled during a drilling operation, these means comprising:

means for measuring at least one load value during the drilling of said element to be drilled with said predetermined cutting parameters;

means of subtraction, from said at least one load value measured during the drilling of said element to be drilled, of said at least one load value representing said overall drag, the result of said subtraction being equal to said at least one load value representing cutting forces.

16. The device according to claim 15 wherein said predetermined cutting parameters are reference cutting parameters specific to the group of materials to which the material being drilled belongs and to the type of drill bit implemented to carry out the drilling operation in progress, a device according to the invention comprising means of comparison of said at least one load value representing cutting forces with predetermined ranges of reference load values representing cutting forces, each of said ranges being specific to one of the materials of said group.

17. The device according to claim 16 comprising means for stopping the drilling operation in progress and/or for sending a warning signal when said at least one load value representing cutting forces belongs to none of said ranges of reference load values representing cutting forces.

18. The device according to claim 15 wherein said predetermined cutting parameters are predetermined material-cutting parameters specific to the material being drilled and to the type of drill bit implemented to carry out the drilling operation in progress, said device comprising means of verification of the cutting forces comprising means for comparing said at least one load value representing cutting forces with a standard range of predetermined material-cutting load values specific to the material being drilled for a drill bit, the cutting edges of which have the minimum quality required for accurate drilling and for said predetermined material-cutting parameters.

19. The device according to claim 18 comprising means for detecting abnormal cutting forces when said at least one load value representing cutting forces is not included in said standard range of material-cutting load values.

20. The device according to claim 15, comprising means for identifying the material being drilled, said means for identifying comprising:

means for activating or maintaining reference cutting parameters specific to the group of materials to which the material being drilled belongs and to the type of drill bit implemented to carry out the drilling operation in progress;

means for determining the material being drilled, said material being drilled being the one for which the range of reference load values representing the cutting forces contains said at least one load value representing the cutting forces;

means for activating predetermined material-cutting parameters specific to the material identified at a step for determining and to the type of drill bit implemented;

means for determining at least one load value representing cutting forces with said material-cutting parameters;

means for validating the material identified during said step for determining, said determining of the material being validated when the at least one load value representing cutting forces, determined in implementing said material-cutting parameters, belongs to an range of load values representing cutting forces predetermined with said material-cutting parameters for the material identified.

* * * * *

UNITED STATES PATENT AND TRADEMARK OFFICE
CERTIFICATE OF CORRECTION

PATENT NO. : 10,532,438 B2
APPLICATION NO. : 15/804499
DATED : January 14, 2020
INVENTOR(S) : Sebastien Pereira It is certified that error appears in the above-identified patent and that said Letters Patent is hereby corrected as shown below:

On the Title Page

Page 2, Under References Cited, Under U.S. Patent Documents:
Delete "7,806,637 B2 10/2010 Dehninger et al."
And insert therefor --7,806,637 B2 10/2010 Oehninger et al.--

Signed and Sealed this
Twenty-fourth Day of May, 2022

Katherine Kelly Vidal
*Director of the United States Patent and Trademark Office*